(12) United States Patent
Fujita et al.

(10) Patent No.: US 8,167,600 B2
(45) Date of Patent: May 1, 2012

(54) APPARATUS FOR PRODUCING POLYMER FILM AND PROCESS FOR PRODUCING POLYMER FILM

(75) Inventors: Shinji Fujita, Shiga (JP); Shoichi Uemura, Shiga (JP); Masaharu Hiki, Shiga (JP); Youichiro Nakagawa, Shiga (JP); Kiyoshi Taniguchi, Shiga (JP); Keizo Kawahara, Shiga (JP); Satoshi Maeda, Shiga (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 209 days.

(21) Appl. No.: 11/912,970

(22) PCT Filed: Apr. 26, 2006

(86) PCT No.: PCT/JP2006/308706
§ 371 (c)(1),
(2), (4) Date: May 6, 2008

(87) PCT Pub. No.: WO2006/118135
PCT Pub. Date: Nov. 9, 2006

(65) Prior Publication Data
US 2009/0032992 A1 Feb. 5, 2009

(30) Foreign Application Priority Data

| | | |
|---|---|---|
| Apr. 27, 2005 | (JP) | 2005-129763 |
| Apr. 27, 2005 | (JP) | 2005-129764 |
| Apr. 27, 2005 | (JP) | 2005-129765 |
| Jun. 14, 2005 | (JP) | 2005-173730 |
| Jul. 19, 2005 | (JP) | 2005-208908 |
| Aug. 24, 2005 | (JP) | 2005-242834 |
| Sep. 30, 2005 | (JP) | 2005-288321 |
| Sep. 30, 2005 | (JP) | 2005-288322 |
| Sep. 30, 2005 | (JP) | 2005-288323 |

(51) Int. Cl.
*B29C 55/16* (2006.01)
*B29C 55/20* (2006.01)

(52) U.S. Cl. ................. 425/66; 425/403.1
(58) Field of Classification Search ........... 264/210.7, 264/288.4, 288.8, 289.6, 290.2; 425/66, 425/290, 302.1, 304, 305.1, 403.1
See application file for complete search history.

(56) References Cited

U.S. PATENT DOCUMENTS 2,219,192 A * 10/1940 Morrill .................. 26/96
(Continued)

FOREIGN PATENT DOCUMENTS
JP 39-29211 12/1939
(Continued)

OTHER PUBLICATIONS

AIPN Machine Translation of JP 09-077315 A, Nakajima et al., Mar. 1997.*

(Continued)

*Primary Examiner* — Joseph Del Sole
*Assistant Examiner* — Ryan Ochylski
(74) *Attorney, Agent, or Firm* — Morrison & Foerster LLP

(57) ABSTRACT

An apparatus and method suitable for producing a polymer film, particularly a polyimide film, perform drying and heat treatment using a tenter type feeding apparatus that suppresses the problems of deformation of film in the vicinity of pore into which the pins bite and breakage of the pores to form long pores in the width direction. The apparatus includes a device to suppress deformation of the film in the vicinity of the tenter pins at the time point when the both ends of the film is pierced with the pins and cools the pin temperature to less than 180° C. at the time when the film is pierced with the pins. Individual pins can be arranged on the innermost side of the pin sheets so that they are all disposed at the same distance both in the film feeding direction in the individual pin sheets and between other pin sheets.

12 Claims, 12 Drawing Sheets

U.S. PATENT DOCUMENTS

| | | | |
|---|---|---|---|
| 2,935,779 A * | 5/1960 | Mohring | 26/96 |
| 3,417,444 A * | 12/1968 | McCreary | 26/96 |
| 3,597,815 A * | 8/1971 | Fish | 26/96 |
| 5,320,267 A * | 6/1994 | Oono et al. | 226/170 |
| 2003/0057595 A1 | 3/2003 | Tsujimoto | |
| 2003/0098522 A1 * | 5/2003 | Nakamura et al. | 264/212 |

FOREIGN PATENT DOCUMENTS

| | | |
|---|---|---|
| JP | 57-189819 | 11/1982 |
| JP | 57-189821 | 11/1982 |
| JP | 57189819 A * | 11/1982 |
| JP | 57189821 A * | 11/1982 |
| JP | 09-077315 | 3/1997 |
| JP | 09-188763 | 7/1997 |
| JP | 09-230316 | 9/1997 |
| JP | 10-251420 | 9/1998 |
| JP | 11-254521 | 9/1999 |
| JP | 2000-191806 | 7/2000 |
| JP | 2004-136613 | 5/2004 |
| KR | 1998-68305 | 10/1998 |

OTHER PUBLICATIONS

AIPN Machine Translation of JP 09-230316 A, Hosoi et al., Sep. 1997.*

European Search Report dated Jun. 16, 2010, directed to corresponding International Application No. PCT/JP06/308706; 3 pgs.

* cited by examiner side view of pin sheet plan view of pin sheet overall view of pin tenter side view of pin sheet plan view of pin sheet

FIG. 4 PRIOR ART
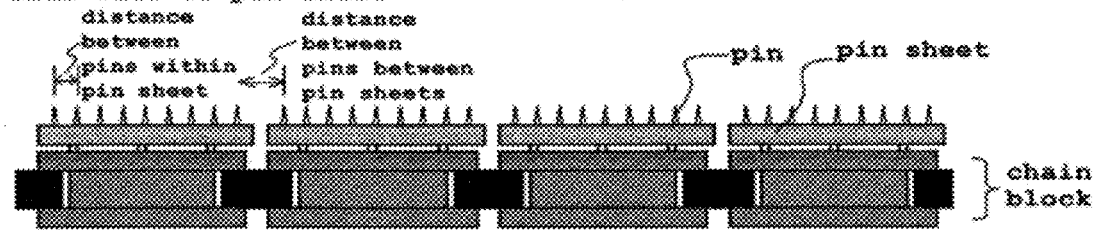
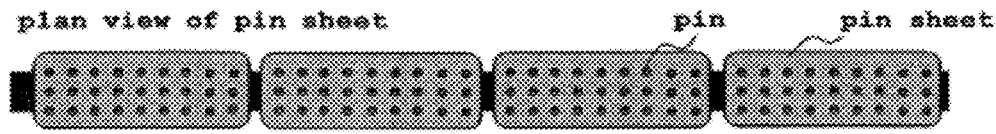
FIG. 5
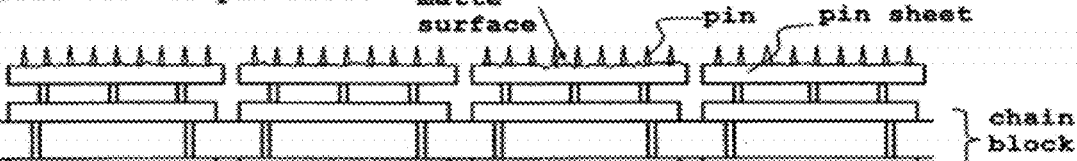
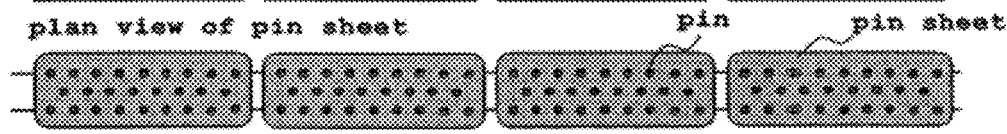
FIG. 6 PRIOR ART
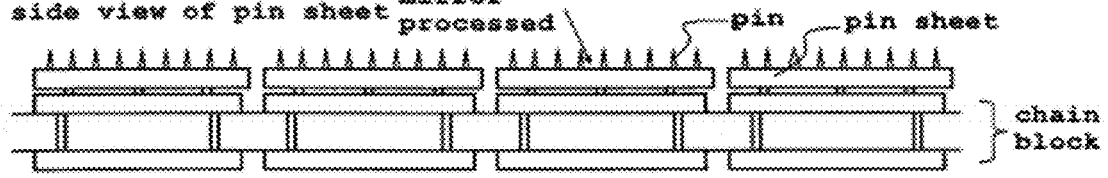
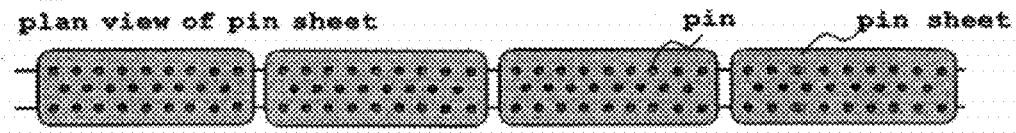

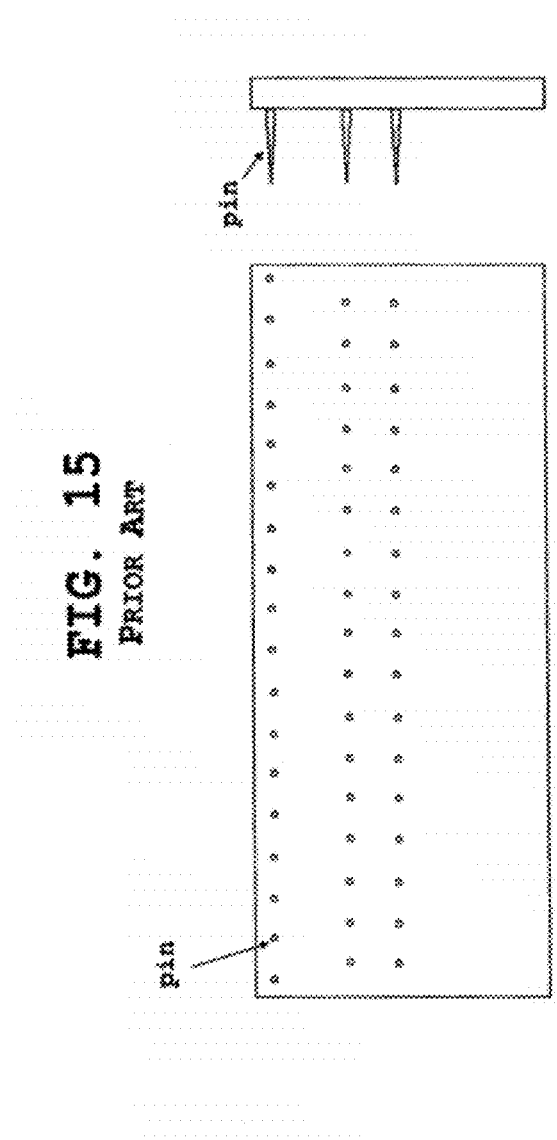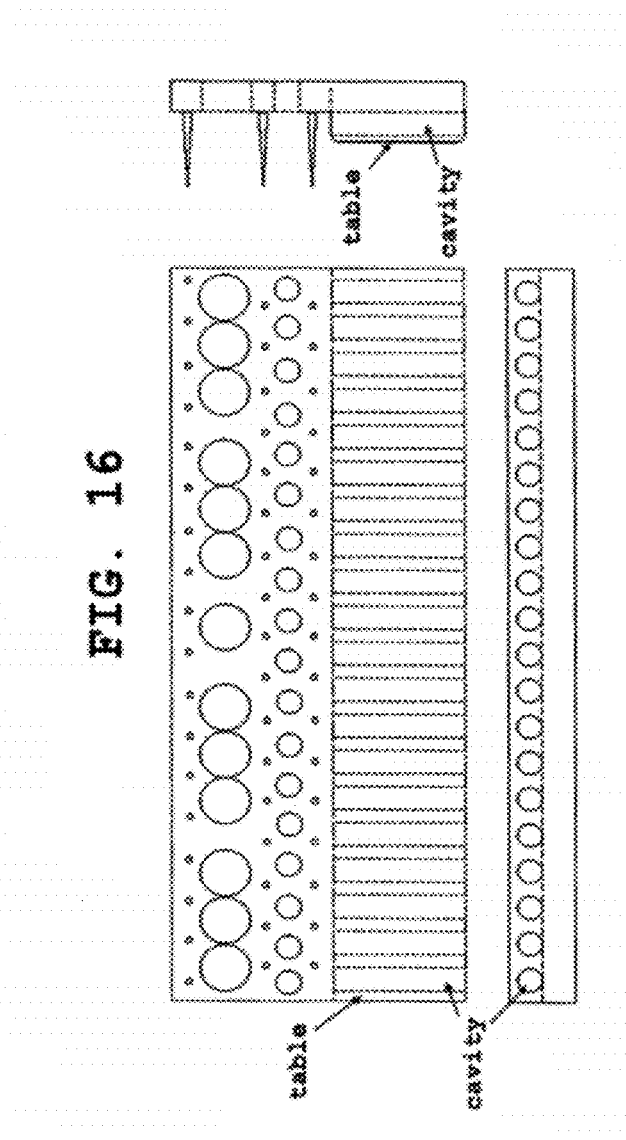

APPARATUS FOR PRODUCING POLYMER FILM AND PROCESS FOR PRODUCING POLYMER FILM

REFERENCE TO RELATED APPLICATIONS

This application is a national stage application under 35 USC 371 of International Application No. PCT/JP2006/308706, filed Apr. 26, 2006, which claims priority from Japanese patent application No. 2005-129763, filed Apr. 27, No. 2005, 2005-129764, filed Apr. 27, 2005, No. 2005-129765, filed Apr. 27, 2005, No. 2005-173730, filed Jun. 14, 2005, No. 2005-208908, filed Jul. 19, 2005, No. 2005-242834, filed Aug. 24, 2005, No. 2005-288321, filed Sept. 30, 2005, No. 2005-288322, filed Sept. 30, 2005 and No. 2005-288323, filed Sept. 30, 2005, the disclosures of which are incorporated herein by reference.

TECHNICAL FIELD OF THE INVENTION

The present invention relates to an apparatus for producing a polymer film. Particularly, the present invention relates to an apparatus for producing a polymer film, which has a characteristic tenter type film feeding processing part for heat-treating a polymer precursor film at a high temperature to give a polymer film, in the final heat treatment to produce the polymer film, and a production method of a polymer film using the apparatus.

BACKGROUND OF THE INVENTION

For production of a polyimide film, a film having self-supporting property, which is made from a polyimide precursor such as a polyamic acid solution and the like (hereinafter to be also referred to as a green film) is imidated at a high temperature. In this case, the green film is heat-treated during feeding to perform drying and heat treatment. Such green film generally shrinks during drying. As an apparatus to feed a film while stretching tightly the film in the width direction by retaining the both ends in the width direction of the film with a number of pins and clips in such a drying•heat treatment of a green film, a tenter type feeding apparatus of a film, which is what is called a tenter, is known (see patent reference 1). In addition, use of a tenter type feeding apparatus for the production of a polyimide film is known in many cases (see patent reference 2).
patent reference 1: JP-B-39-029211
patent reference 2: JP-A-09-188763

Use of a film feeding apparatus for drying purposes to prevent development of wrinkles in the drying step after dyeing cloth has long been known well. In addition to drying of cloth, it is also used for drying an undried plastic film while feeding in a drying step during solvent film forming method. Using a film feeding apparatus, shrinkage of a film in its width direction due to the heat during the drying•heat treatment is suppressed, whereby development of wrinkles in the film after the drying•heat treatment due to the shrinkage can be prevented.

While the film shrinks not only in the width direction of the film but omnidirectionally, since a feeding tension acts on the feeding direction of the film, it has a suppressive effect on the shrinkage. In this way, using a tenter type feeding apparatus for feeding an undried film during a drying•heat treatment, the strength and flatness necessary for the film can be ensured.

Of the tenter type feeding apparatuses, a tenter type feeding apparatus that retains a film while stretching the film tightly in the width direction by allowing a number of pins to bite into the film along the both ends of the film is constituted by a pair of movement chains disposed in parallel, pin sheets lined up and supported thereby, and a number of pins set on the sheets. A feeding apparatus using pins is superior in the apparatus cost and downsizing of the apparatus because the structure is simple as compared to a feeding apparatus using clips and can be converted to a structure wherein the pathway of the feeding conveyor in a drying chamber is inverted. On the other hand, the number of the pins needs to be minimized where possible because small pieces of the film are produced as dust when the pins bite into the film. In addition, the apparatus has problems in that the pores made by the pins biting into the film surface are broken to form long pores in the width direction of the film when the shrinkage force of the film becomes high, and the like.

To improve them, a method including use of a film having high tear strength for a separate reinforcement to be superposed on the gripped portion of the film by the pins has also been proposed (see patent reference 3).

Moreover, a tenter type feeding apparatus for feeding a web and the like, wherein the density of the innermost side of the arrangement of pins on the both ends of the web is increased and the arrangement density of the outer side thereof is made smaller has been proposed (see patent reference 4). These proposed improvement plans still have problems in the production of a film in which pores made by the pins biting thereinto easily produce breakage to form long pores in the width direction of the film due to the shrinkage of the film.

That is, conventional tenter type feeding apparatuses are not sufficiently satisfactory for end users due to the problem of breakage of pores (made by the pins biting thereinto) to form long pores in the width direction of the film and easy development of quality failure such as development of wrinkles and the like, which cause production loss and low production efficiency.
patent reference 3: JP-A-11-254521
patent reference 4: JP-A-09-077315

Summary of the Invention

The present invention aims at providing an apparatus suitable for producing a polymer film, which is used for producing a polyimide film wherein drying and heat treatment are performed using a tenter type feeding apparatus, which apparatus being capable of suppressing a problem of breakage of pores (made by the pins biting thereinto) to form long pores in the width direction of the film and efficiently producing a film with a superior quality, as well as a production method of a polymer film.

Particularly, the present invention aims at providing an apparatus suitable for providing a polyimide film which is a polymer film superior in the flatness and uniformity preferable for a substrate for electronic parts, and superior in the heat resistance with less warpage and curling even after a high temperature treatment, as well as a production method therefor.

The present inventors have conducted intensive studies and found that, when a tenter type feeding apparatus is used to perform drying and a heat treatment for the production of a polymer film such as polyimide film and the like, the problem of breakage of pores (made by the pins biting thereinto) to form long pores outwardly in the width direction of the film can be suppressed by designing a means for sticking pins into the film for feeding the film by holding the both ends with the pins, and a film with a superior quality can be produced efficiently, and created an apparatus for producing a polymer film suitable for the production of a polymer film.

Accordingly, the present invention provides the following constitution.

(1) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins, and the film is fed while being stretched tightly in the width direction and/or the feeding direction, an apparatus comprising a means to suppress deformation of a film upon piercing the both ends of the film through pins.

(2) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins, and the film is fed while being stretched tightly in the width direction and/or the feeding direction, an apparatus comprising a means to cool the pin temperature to less than 180° C. at the time point when the film is fed upon piercing the both ends of the film through pins.

(3) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins, and the film is fed while being stretched tightly in the width direction and/or the feeding direction, an apparatus wherein individual pins arranged on the innermost side in the film width direction are all disposed at the same distance both in the film feeding direction in the individual pin sheets and between other pin sheets, while the pin sheets on the both ends of the film run parallel with the pin sheet on the corresponding side in a tenter treatment chamber.

(4) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins, and the film is fed while being stretched tightly in the width direction and/or the feeding direction, an apparatus wherein concave and convex of a maximum amplitude of 5-5000 μm are formed at least on the surface of the side of the pin sheet to be in contact with the pierced film.

(5) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins, and the film is fed while being stretched tightly in the width direction and/or the feeding direction, an apparatus wherein the angle of planting the pins in the pin sheet is 0.5-15 degrees toward the outer side of the width direction of the film relative to the perpendicular direction of the pin sheet.

(6) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins by pressing down the film with a hold down brush roll, and the film is fed while being stretched tightly in the width direction and/or the feeding direction, an apparatus wherein the pin sheet has a part higher than a pin pedestal at an outer side relative to the width direction and the film does not contact the pin pedestal when the film is pressed with the aforementioned hold down brush roll and pierced with the pins.

(7) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins by pressing down the film with a hold down brush roll, and the film is fed while being stretched tightly in the width direction and/or the feeding direction, an apparatus wherein the pin sheet has a part higher than a pin pedestal provided at an outer side relative to the width direction, the pin pedestal provided with the pin of the pin sheet has a cavity and the film does not contact the pin pedestal when the film is pressed with the aforementioned hold down brush roll and pierced with a pin.

(8) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins by pressing down the film with a hold down brush roll, and the film is fed while being stretched tightly in the width direction and/or the feeding direction, an apparatus wherein the pin sheet has a part higher than a pin pedestal provided at an outer side relative to the width direction, the film does not contact the pin pedestal when the film is pressed with the aforementioned hold down brush roll and pierced with the pins, and the distance between the aforementioned part higher than a pin pedestal provided at an outer side relative to the width direction and the pin provided in the pin sheet at the outermost part of the width direction is not less than 2 mm and not more than 10 mm, and a pin sheet having a pin density (P) satisfying the following formula (1):

$$2/(t+70) \leq P \leq 8/(t+70) \qquad (1)$$

wherein t is a film thickness (μm) after tenter processing, and P is a density (pins/mm$^2$) of the pins relative to the total area of the pedestal provided with the pins other than the table provided on the outer side relative to the width direction of the pin sheet (a part higher than the pin pedestal).

(9) In apparatuses for producing a polymer film, comprising a tenter type processing part constituted with a number of pin sheets and a number of pins provided for individual pin sheets, wherein, when a film end fixing type tenter is used to perform a treatment such as a heat treatment and the like of a polymer film or a polymer precursor film, film ends are held at the both ends in the width direction of the film by piercing the both ends of the film with the pins, and the film is fed while being stretched tightly in the width direction and/or the feeding direction, an apparatus of claim 1 which comprises a member for piercing the both ends of the film with the pin, the member being provided with a brush made of a bristle material made from a material having a melting point or softening point of not less than 150° C. and a tensile modulus of not less than 4 GPa.

(10) A production method of a polymer film, comprising use of the apparatus described above.

(11) The production method of claim 24, wherein the apparatus described above is used, the film does not contact the pin pedestal when the film is pressed with the aforementioned brush roll and pierced with a pin; and the film ends are held by the pin sheets such that the position of the end in the width direction of the film during the treatment with a tenter can be 5-25 mm outside the outermost part in the width direction of the pins provided on the pin sheets.

According to the apparatus for producing a polymer film of the present invention, deformation at a gripped portion of a film is suppressed while the film is held by the pins, and breakage of pores (made by the pins biting thereinto) to form long pores mainly in the width direction of the film can be suppressed while the pin sheets on the both ends of the film run parallel with the pin sheet on the corresponding side in a tenter type processing part (feeding apparatus) of a polymer film such as polyimide film and the like, as a result of which the distortion and uneven film thickness of the whole film can be decreased. In addition, it is effective for resolving problems in that many troubles occur such as frequent release of the film from the pins in the tenter, jammed film and the like, pin part is easily torn and the torn pieces of the film are scattered in the pin tenter to deteriorate the environment, a high quality film cannot be obtained and the like. Accordingly, the apparatus easily produces a high quality polymer film such as polyimide film and the like, contributes to the producibility of polymer film production, and is industrially extremely effective as an apparatus for producing a polymer film as well as a production method of a polymer film.

BRIEF DESCRIPTION OF THE DRAWINGS

FIG. 4 shows an outline example of the gripper of a conventional tenter type film processing machine.

FIG. 5 shows an outline of a pin sheet with a matte-processed surface to be in contact with the film, which is in the tenter type film processing machine of the present invention.

FIG. 6 shows an outline of a pin sheet with a mirror-processed surface to be in contact with the film, which is in a conventional tenter type film processing machine.

FIG. 15 shows a whole outline showing an outline of a pin sheet to be in contact with the film in a conventional tenter type film processing machine.

FIG. 16 shows an outline of a pin sheet wherein a table is provided on the outer side in the width direction of the pin to be in contact with the film and the pedestal of the pin and a part higher than the pin pedestal both have a cavity in the tenter type film processing machine of the present invention.

DETAILED DESCRIPTION OF THE INVENTION

Figure 1:
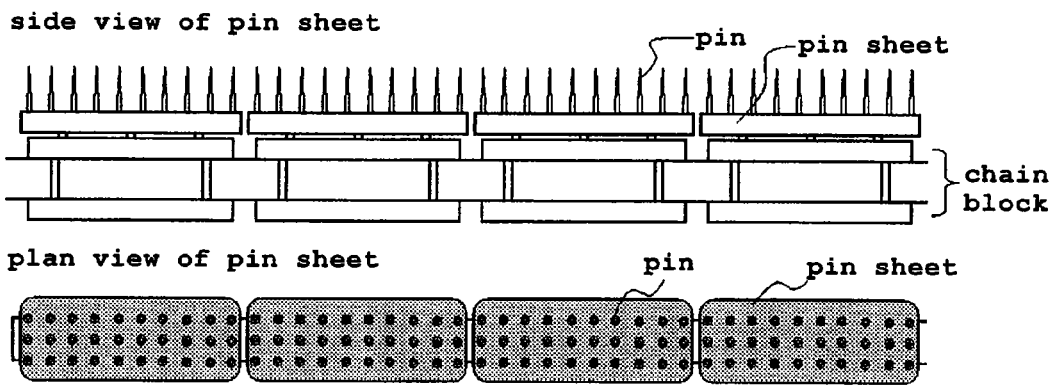
FIG. 1 shows an outline example of a pin sheet in the tenter type film processing machine of the present invention.

As a polymer film to which the apparatus for producing a polymer film and production method of the present invention are applied, films made from a high melting point polymer or a non-melting polymer such as polyimide, polyamideimide, cellulose acetate, polycarbonate, polyvinyl chloride, aramid and the like, and the like can be mentioned.

These polymer films are produced by casting a solution containing such polymer, which is followed by drying and a heat treatment.

As the polymer solution to be used for producing a polymer film to which the present invention is applied, N-methyl-2-pyrrolidone solution or N,N-dimethylacetamide solution of polyamideimide, polyamic acid, which is a polyimide precursor, or solvent-soluble polyimide, methylene chloride solution or methanol solution of cellulose acetate, methylene chloride solution or meta-cresol solution of polycarbonate, tetrahydrofuran solution of polyvinyl chloride, N-methyl-2-pyrrolidone solution of aramid and the like can be mentioned.

The apparatus for producing a polymer film and production method of the present invention are most preferably applied to a cast film forming method using, particularly, N-methyl-2-pyrrolidone solution, N,N-dimethylacetamide solution, N,N-dimethylformamide solution and the like of polyimide and polyamic acid which is a precursor of polyimide benzoxazole.

The polymer film of the present invention is described in detail by referring to a polyimide film as an example, which is not to be construed as limitative.

To obtain a polyimide film to which the present invention can be preferably applied, aromatic diamines and aromatic tetracarboxylic acids are reacted. Aromatic diamines and aromatic tetracarboxylic acids (anhydrides) are subjected to a (ring opening) polyaddition reaction in a solvent to give a solution of polyamic acid, which is a polyimide precursor. Then, a polyimide precursor film is formed from the polyamic acid solution and the film is applied to drying•heat treatment•dehydrating condensation (imidation) to give a polyimide film.

A polyimide film as a polymer film to which the present invention can be preferably applied is not particularly limited. A polyimide obtained by a combination of the following aromatic diamines and aromatic tetracarboxylic acids (anhydrides) can be recited as preferable examples.

A. Combination of aromatic diamines having a benzoxazole structure and aromatic tetracarboxylic acids.
B. Combination of aromatic diamines having a diaminodiphenylether skeleton and aromatic tetracarboxylic acids having a pyromellitic acid skeleton.
C. Combination of aromatic diamines having a phenylenediamine skeleton and aromatic tetracarboxylic acids having a biphenyltetracarboxylic acid skeleton.
D. Combination of one or more kinds of the above-mentioned ABC.

As the aforementioned aromatic diamines having a benzoxazole structure, the following compounds can be recited as examples.

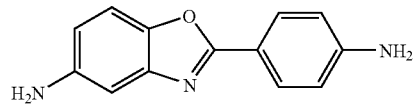

[Formula 1]

5-amino-2-(p-aminophenyl)benzoxazole

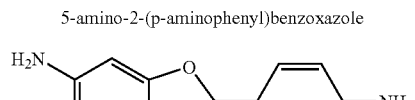

[Formula 2]

6-amino-2-(p-aminophenyl)benzoxazole

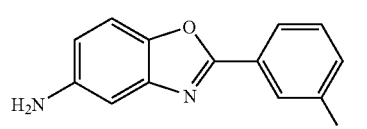

[Formula 3]

5-amino-2-(m-aminophenyl)benzoxazole

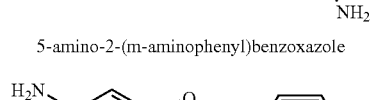

[Formula 4]

6-amino-2-(m-aminophenyl)benzoxazole 2,2'-p-phenylenebis(5-aminobenzoxazole), 2,2'-p-phenylenebis(6-aminobenzoxazole), 1-(5-aminobenzooxazolo)-4-(6-aminobenzooxazolo)benzene, 2,6-(4,4'-diaminodiphenyl)benzo[1,2-d:5,4-d']bisoxazole, 2,6-(4,4'-diaminodiphenyl)benzo[1,2-d:4,5-d']bisoxazole, 2,6-(3,4'-diaminodiphenyl)benzo[1,2-d:5,4-d']bisoxazole, 2,6-(3,4'-diaminodiphenyl)benzo[1,2-d:4,5-d']bisoxazole, 2,6-(3,3'-diaminodiphenyl)benzo[1,2-d:5,4-d']bisoxazole, 2,6-(3,3'-diaminodiphenyl)benzo[1,2-d:4,5-d']bisoxazole.

Of these, from the aspect easy synthesis, each isomer of amino(aminophenyl)benzoxazole is preferable. As used herein, "each isomer" refers to each isomer determined according to the coordination sites of two amino groups possessed by amino(aminophenyl)benzoxazole (e.g., respective compounds described in the above-mentioned "Formula 1"-"Formula 4"). These diamines may be used alone or two or more kinds thereof may be used in combination.

In the present invention, the aforementioned aromatic diamine having a benzoxazole structure is preferably used in 70 mol % or above.

As the aforementioned aromatic diamines having a diaminodiphenylether skeleton, 4,4'-diaminodiphenylether (DADE), 3,3'-diaminodiphenylether and 3,4'-diaminodiphenylether and derivatives thereof can be mentioned.

As the aromatic diamines having a phenylenediamine skeleton in the present invention, p-phenylenediamine, m-phenylenediamine, o-phenylenediamine and derivatives thereof can be mentioned.

An aromatic diamine other than those mentioned above may be used.

As the aforementioned aromatic tetracarboxylic acids, aromatic tetracarboxylic acids having a pyromellitic acid skeleton, namely, pyromellitic acid and anhydride or halide thereof, and aromatic tetracarboxylic acids having a biphenyltetracarboxylic acid skeleton, namely, biphenyltetracarboxylic acid and anhydride or halide thereof can be mentioned.

The following aromatic tetracarboxylic acid other than those mentioned above may be used.

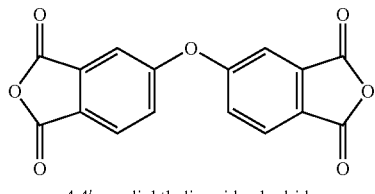

4,4'-oxydiphthalic acid anhydride [Formula 5]

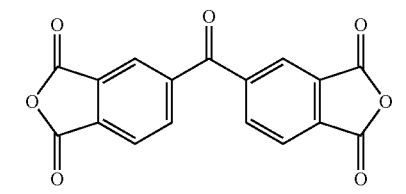

3,3',4,4'-benzophenonetetracarboxylic acid anhydride [Formula 6]

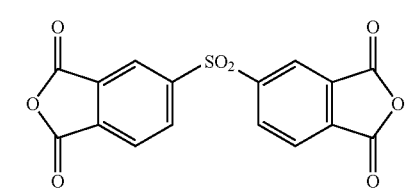

3,3',4,4'-diphenylsulfonetetracarboxylic acid anhydride [Formula 7]

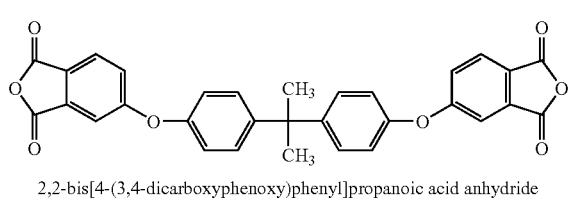

2,2-bis[4-(3,4-dicarboxyphenoxy)phenyl]propanoic acid anhydride [Formula 8]

These tetracarboxylic acids may be used alone or two or more kinds thereof may be used in combination.

The solvent to be used when aromatic diamines and aromatic tetracarboxylic anhydrides are polymerized to give polyamic acid is not particularly limited as long as it dissolves both a monomer to be the starting material and the polyamic acid produced. A polar organic solvent is preferable and, for example, N-methyl-2-pyrrolidone, N-acetyl-2-pyrrolidone, N,N-dimethylformamide, N,N-diethylformamide, N,N-dimethylacetamide, dimethyl sulfoxide, hexamethylphosphoric amide, ethylcellosolve acetate, diethyleneglycol dimethylether, sulfolane, halogenated phenols and the like can be used. Of these, N-methyl-2-pyrrolidone and N,N-dimethylacetamide are preferably applied. These solvents can be used alone or in a mixture. The amount of the solvent to be used may be an amount sufficient to dissolve a monomer to be the starting material. A specific amount used is such an amount that renders the mass of the monomer in a solution dissolving the monomer generally 5-40% by mass, preferably 10-20% by mass.

The conditions of the polymerization reaction to give the aforementioned polyamic acid (hereinafter to be also simply referred to as "polymerization reaction") may be conventionally known conditions. Specific examples thereof include continuous stirring and/or mixing in an organic solvent within a temperature range of 0-80° C. for 10 min-30 hr. Where necessary, the polymerization reaction may be divided or the temperature may be increased or decreased. In this case, the order of addition of both monomers is not particularly limited, but aromatic tetracarboxylic anhydrides are preferably added to a solution of aromatic diamines. The mass of polyamic acid in the polyamic acid solution obtained by the polymerization reaction is preferably 5-40% by mass, more preferably 10-30% by mass, and the viscosity of the aforementioned solution as measured by a Brookfield viscosimeter (25° C.) is preferably 10-2000 Pa·s, more preferably 100-1000 Pa·s, from the aspect of feeding stability.

While the reduced viscosity ($\eta$sp/C) of the polyamic acid in the present invention is not particularly limited, not less than 3.0 dl/g is preferable, not less than 4.0 dl/g is more preferable, and not less than 5.0 dl/g is still more preferable.

In addition, a small amount of a terminal sealing agent may be added to aromatic diamines before the polymerization reaction to control the polymerization. As the terminal sealing agent, a compound having a carbon-carbon double bond such as maleic anhydride and the like can be mentioned. The amount of maleic anhydride when it is used is preferably 0.001-1.0 mol per 1 mol of aromatic diamines.

Vacuum defoaming during the polymerization reaction is effective for producing a polyamic acid solution with good quality. Moreover, when the polyamic acid solution mentioned below is cast or applied onto a support, removal of air bubbles and dissolved gas in the solution in advance by a treatment such as reduction of pressure and the like is also an effective treatment to afford the polyimide film in the present invention.

For production of a polymer film, first of all, a polyamic acid solution is applied to a support to form a film. The support to which a polyamic acid solution is applied only needs to have smoothness and rigidity of the level sufficient to form a film from the polyamic acid solution. For example, a drum-like or belt-like rotator with a surface made of a metal, plastic, glass, porcelain and the like, and the like can be mentioned. In addition, it is a preferable embodiment to utilize a polymer film having appropriate rigidity and high smoothness. Particularly, the surface of a support is preferably a metal, more preferably stainless which is rust-free and superior in the corrosion resistance. The surface of the support may be plated with a metal such as Cr, Ni, Sn and the like. Where necessary, the surface of the support may be a mirror- or matte-processed. Furthermore, the amount of air and temperature during drying may be appropriately selected and employed depending on difference in the support. For coating of a support with a polyamic acid solution, casting from a slit spinneret, extrusion from an extruder, squeeze coating, reverse coating, die coating, applicator coating, wirebar coating and the like may be used. The method is not limited to these and conventionally-known solution application means can be appropriately used.

The film-like polyamic acid solution is dried to the level exhibiting the self-supporting property to give a polyimide precursor film (also referred to as a green film), which is treated at a high temperature to allow imidation to give a polyimide film.

As a method for imidating a green film, a method including carrying out an imidation reaction by applying a heat treatment using a polyamic acid solution free of a cyclization (imidation) catalyst and a dehydrating agent (what is called a thermal cyclization method) and a chemical cyclization method wherein an imidation reaction is performed by the action of a cyclization catalyst and dehydrating agent in a polyamic acid solution containing them can be mentioned.

The temperature of the heat treatment in the thermal cyclization method is preferably 150-500° C. When the temperature of the heat treatment is lower than this range, sufficient cyclization becomes difficult. When it is higher than this range, the degradation proceeds and the film tends to be brittle. A more preferable embodiment is, for example, a two-stage heat treatment step including an initial stage heat treatment for treating at 150-250° C. for 3-20 min and a latter stage heat treatment for treating with heat at 350-500° C. for 3-20 min.

In a chemical cyclization method, a polyamic acid solution is applied to a support, an imidation reaction is partially carried out to form a self-supportive film, and then the imidation is completely performed by heating. In this case, the condition for partial imidation reaction is a heat treatment preferably at 100-200° C. for 3-20 min. The condition for complete imidation reaction is a heat treatment preferably at 200-400° C. for 3-20 min.

The timing of addition of a cyclization catalyst to a polyamic acid solution is not particularly limited, and the catalyst may be added in advance prior to the polymerization reaction to give polyamic acid. Specific examples of the cyclization catalyst include aliphatic tertiary amines such as trimethylamine, triethylamine and the like, heterocyclic tertiary amines such as isoquinoline, pyridine, beta-picoline and the like. Of these, at least one kind of amine selected from heterocyclic tertiary amines is preferable. While the amount of the cyclization catalyst to be used relative to 1 mol of polyamic acid is not particularly limited, it is preferably 0.5-8 mol.

The timing of addition of a dehydrating agent to a polyamic acid solution is not particularly limited, and the dehydrating agent may be added in advance prior to the polymerization reaction to give polyamic acid. Specific examples of the dehydrating agent include aliphatic carboxylic anhydrides such as acetic anhydride, propionic anhydride, butyric anhydride and the like, aromatic carboxylic anhydrides such as benzoic anhydride and the like, and the like. Of these, acetic anhydride, benzoic anhydride and a mixture thereof are preferable. In addition, the amount of the dehydrating agent to be used relative to 1 mol of polyamic acid is not particularly limited, it is preferably 0.1-4 mol. When a dehydrating agent is used, a gelling retardant such as acetylacetone and the like may be used in combination.

While the thickness of the polymer film is not particularly limited, it is 5-150 μm, preferably 10-100 μm, in consideration of use as a base substrate for the printed circuit board mentioned below. In the case of polyimide, the film thickness can be easily controlled by the amount of the polyamic acid solution to be applied to a support and the concentration of the polyamic acid solution.

The slip property of a polymer film is preferably improved by adding a lubricant to polyimide and the like to form ultrafine concaves and convexes on the film surface.

As the lubricant, inorganic or organic fine particles having an average particle size of about 0.03 μm-3 μm can be used. Specific examples thereof include titanium oxide, alumina, silica, calcium carbonate, calcium phosphate, calcium hydrogenphosphate, calcium pyrrophosphate, magnesium oxide, calcium oxide, clay mineral and the like.

The apparatus for producing a polymer film of the present invention comprises a tenter type processing part wherein film ends are held at the both ends in the width direction of the film, which is constituted with a number of pin sheets and a number of pins provided for individual pin sheets, by piercing the both ends of the film with the pins, and the film is fed while being stretched tightly in the width direction and/or the feeding direction (hereinafter to be also referred to as a pin tenter), and has a means to suppress deformation of the film in the vicinity of the pins at the time point when the film is fed with the pins piercing the both ends of the film.

As a preferable embodiment of the means to suppress deformation of the film in the vicinity of the pins, one having a means to cool the pin temperature to less than 180° C. can be mentioned. A means to cool the pin temperature to less than 180° C. can be preferably applied, for example, in the drying or imidation step for the production of a polyimide film. Particularly, it is preferably applied in the step of imidation of a green film by a heat treatment. For example, when a green film is heat-treated in a pin tenter, the both ends in the width direction of the film are held by sticking the film with pins, and the film is fed while being stretched tightly in the width direction and/or the feeding direction and subjected to imidation in a tenter heat treatment furnace. While the lower limit of the pin temperature is not particularly present, when it is too low, dew drops may attach to the pins or the temperature distribution in the tenter may become large. Thus, not less than 30° C. is suitable.

A pin cooling means, which is one of the preferable embodiments of the present invention, is described in detail. A tenter using such pin as a film-fixing means is referred to as a pin tenter. The pin sheets for the pin tenter are combined with, for example, general driving chains shown in FIGS. 1, 2 and set as a caterpillar track. Known driving chains of the pin tenter include a type wherein the chain passes in a treatment furnace for both ways, and a type wherein the chain passes outside the treatment pathway for the homeward way. In the present invention, a type wherein the chain passes in a treatment furnace for both ways is preferably employed. This type enables downsizing of the whole apparatus to a compact one.

Figure 2:
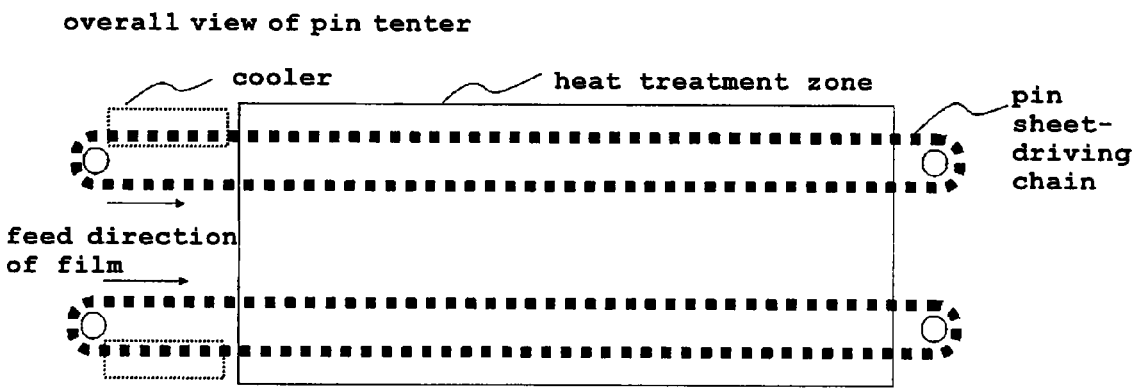
FIG. 2 shows an outline example of the whole tenter type film processing machine of the present invention.

As shown in FIG. 2, in a treatment chamber in which a treatment such as a heat treatment and the like is performed, a number of pin sheets provided with a number of pins are arranged on both ends of a film. The individual pin sheets have plural pins serially arranged on the innermost side in the feeding direction and other plural pins. These pins feed the film by holding the both ends thereof. In the treatment chamber, these plural pin sheets run in parallel to each other on both ends of the film and maintained at an extremely high temperature to allow heat treatment of the film. The pins and pin sheets are exposed to the high temperature at least in this treatment chamber. After completion of the heat treatment of the film, the pin turns and returns to the original position where it holds a new film.

In the present invention, the pin and pin sheet are preferably cooled between the return path of the driving chain on the entry side of the treatment path and the pinning zone.

Conventional tenter type feeding apparatuses do not have a means to cool pins and pin sheets after heating to a heat treatment temperature of, for example, 450° C., and the high temperature is maintained at the time point when the both ends of the film are held and the feeding is started. As a result, when the both ends of the film are pierced with the pins, uniformity of film holding is difficult to maintain, expansion of pores (made by the pins biting thereinto) in the width direction or feeding direction of the film and breakage easily occur, the film as a whole shows increased distortion, and the uneven film thickness expands. In the present invention, therefore, a cooling means is provided at a part immediately before the pins after completion of the film heat treatment turn and return to the position to hold the film, whereby the pins are cooled to lower than 180° C. Consequently, the pins are sufficiently cooled at the film holding start time point, and the uniformity of film holding can be maintained during piercing of the both ends of the film with the pins, expansion of pores in the width direction of the film or feeding direction from the pores into which the pins bite and occurrence of breakage can be suppressed, the distortion of the film as a whole can be decreased, and the uneven film thickness can be decreased.

As a cooling means in the present invention, any of air cooling and water cooling can be used, and a cooling medium other than air and water can also be used. From the aspect of cooling efficiency, a liquid cooling medium is preferably used. Moreover, considering that the tenter itself is heated to the fire point or above of a conventional organic solvent, a cooling means by water cooling is most preferable. To prevent dew drops near the cooling part, dew point control of the atmosphere and cold air when using air as a cooling medium is preferable.

One of the preferable embodiments of the apparatus for producing a polymer film of the present invention is one wherein individual pins arranged on the innermost side in the film width direction in a pin tenter are all provided at equal intervals in the film feeding direction in individual pin sheets as well as between other pin sheets.

The pin arrangement is described in detail. As shown in FIGS. 1-4, in a treatment chamber in which a treatment such as a heat treatment and the like is performed, a number of pin sheets provided with a number of pins are arranged on both ends of a film, the individual pin sheets have plural pins serially arranged on the innermost side in the feeding direction and other plural pins, the arrangement of the aforementioned individual pin sheets having plural pins serially arranged on the innermost side in the feeding direction is important. When the plural pins serially arranged in the feeding direction on the innermost side of the individual pin sheets are, for example, A1, A2, A3, A4 . . . An in the feeding direction, and the plural pins serially arranged in the feeding direction on the innermost side of the adjacent pin sheets are, for example, B1, B2, B3, B4 . . . Bn in the feeding direction, the intervals between respective pins of A1, A2, A3, A4 . . . An and B1, B2, B3, B4 . . . Bn are substantially the same. The distance between An and B1 is also substantially the same as the former, and the aforementioned relationship can be found in plural pins serially arranged on the innermost side in the feeding direction in other pin sheets. The plural pin sheets run parallel to each other at the both ends of the film in the treatment chamber, where the aforementioned pin intervals are maintained and the film is held and fed as long as the plural pin sheets run parallel to each other at the both ends of the film at least in this treatment chamber.

The pin intervals are preferably not more than 1/10 relative to the width of the film being held. This suppresses the deformation of the film in the vicinity of the pin. As a result, the uniformity of film holding can be easily maintained, expansion of pores in the width direction of the film or in the feeding direction from the pores into which the pins bite and occurrence of breakage can be suppressed, the distortion of the film as a whole can be decreased, and the uneven film thickness can be decreased.

In addition, a preferable embodiment of the apparatus for producing a polymer film of the present invention is an apparatus for producing a polymer film comprising a tenter type processing part wherein film ends are held at the both ends in the width direction of the film, which is constituted with a number of pin sheets and a number of pins provided for individual pin sheets, by piercing the both ends of the film with the pins, and the film is fed while being stretched tightly in the width direction and/or in the feeding direction, and concave and convex of a maximum amplitude of 5-5000 μm are formed at least on the surface of the side of the pin sheet to be in contact with the pierced film. The shape and size of the concave and convex having a maximum amplitude of 5-5000 μm is not particularly limited as long as it can suppress welding and heat conduction between the film and the contact surface of the pin sheet, as well as deformation of the film in the vicinity of the pin. Preferably, (1) a pin sheet having concave and convex having an average surface roughness Ra of 10-1000 μm, preferably 10-150 μm, more preferably 10-70 μm, which are produced by matte processing the surface to be in contact with the pierced film, (2) a pin sheet having concave and convex which are columnar protrusions (for example, rivet) of a diameter or one side of 0.2-5.0 mm, preferably 0.2-3.0 mm, height 0.3-10.0 mm, preferably 0.3-4.0 mm, formed on the surface to be in contact with the pierced film, (3) a pin sheet having concave and convex which are grooves of width 0.05-5.0 mm, preferably 0.05-1.5 mm, depth 0.05-5.0 mm, preferably 0.08-0.8 mm, formed on the surface can be mentioned. The preferable pin sheets are shown, for example, in FIG. 5 and FIG. 7.

Figure 8:
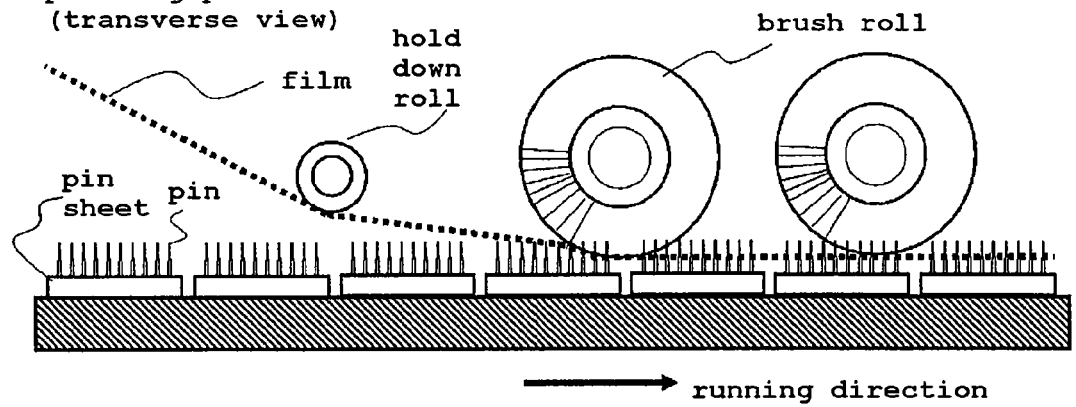
FIG. 8 is a schematic diagram of the outline of a pin piercing part of a tenter type film processing machine.

In the apparatus for producing a polymer film of the present invention, a means for piercing the both ends of the film by pins using a hold down brush roll as shown in FIG. 8 is preferably employed.

For example, at the time point when the pins pierce the both ends of the film, a member with a brush made of a bristle material made from a material having a melting point or softening point of not less than 150° C. and an elastic modulus of not less than 4 GPa is preferably used to have the film end pierced by the pin. As the member with a brush made of a bristle material, for example, a brush roll with a brush provided on the periphery of the cylindrical flat plane can be preferably used.

A brush made of a bristle material made from a material having a melting point or softening point of not less than 150° C. and an elastic modulus of not less than 4 GPa is preferable because it can afford uniform piercing of the film due to such property, and degradation of the function is extremely small after using for a long time. For example, polymer fiber, carbon fiber, glass fiber and the like having a high elastic modulus can be mentioned. More preferably, it is a polymer material such as polymer fiber and the like, aromatic polyamide, for example, Conex (manufactured by TEIJIN LIMITED) and the like can be mentioned.

In addition, a preferable embodiment of the apparatus for producing a polymer film of the present invention is an apparatus for producing a polymer film comprising a tenter type processing part wherein film ends are held at the both ends in the width direction of the film, which is constituted with a number of pin sheets and a number of pins provided for individual pin sheets, by piercing the both ends of the film with the pins, and the film is fed while being stretched tightly in the width direction and/or in the feeding direction, and the angle of planting the pins in the pin sheet is 0.5-15 degrees toward the outer side of the width direction of the film relative to the perpendicular direction of the pin sheet. Preferably, it has a slant of 1-10 degrees, more preferably about 2-7 degrees. The presence of such angle drastically reduces unstable piercing of the pins due to blowing of the film with a hot air and the like and the possibility of falling off of the film from the pin, and can suppress the deformation of the film in the vicinity of the pin. When the angle is smaller than this range, a sufficient effect cannot be obtained. When the angle is greater than this range, the film may be torn during removal of the film from the pins to cause breakage and the like. The deformation of the film in the vicinity of the pin can be further suppressed by forming a mechanism for controlling the piercing depth, and controlling the piercing depth to a certain level.

As a method for controlling the piercing depth, a constitution afforded by controlling the protrusion height in a structure wherein protrusions are formed on the pin sheet and pressing down depth of the film is controlled when it hits the protrusion.

Figure 10:
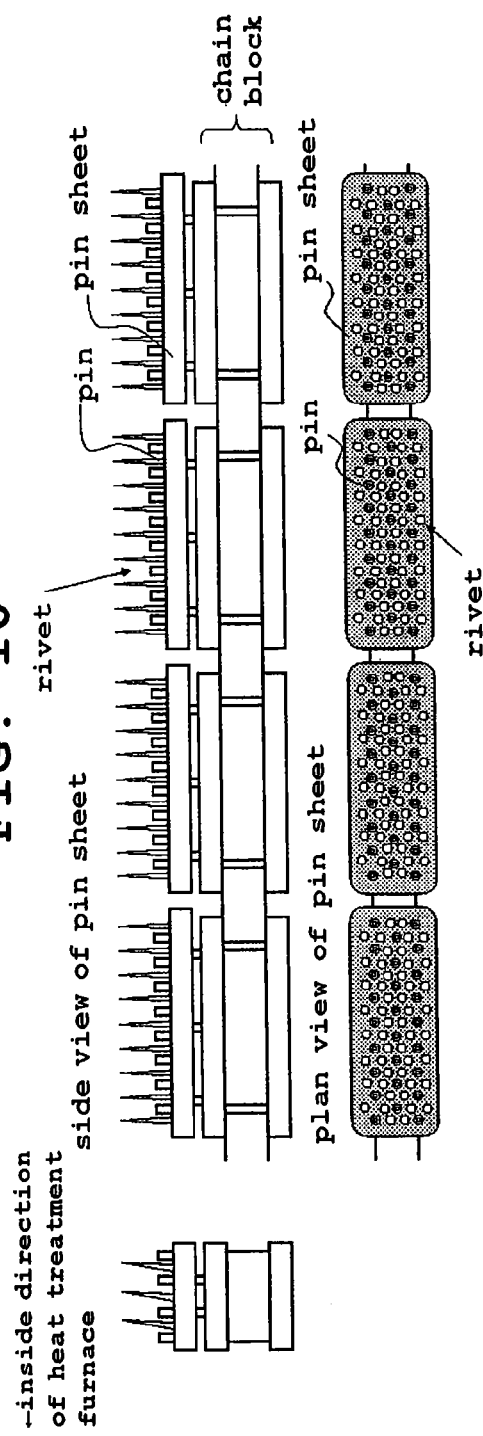
FIG. 10 is a schematic diagram of the outline of one embodiment of a pin sheet with a mechanism for controlling the depth of piercing of the pin in the tenter type film processing machine of the present invention.

Such protrusion can be formed by planting rivets and the like in, for example, a pin sheet shown in FIG. 10, where the protrusion height may be about 2-70%, preferably about 10-40%, of the pin height. When the protrusion height is insufficient, the film may contact the pin sheet in some parts, which in turn may sometimes cause welding of the film and the pin sheet and the like. When the protrusion is too high, piercing depth becomes insufficient and the film may be released from the pins.

The film can be pierced with the pin by pressing down the film onto the pin with a pressing tool. In this case, the pressing down depth may be set to a middle part of the pin, whereby the piercing depth of the film can be preferably adjusted.

It is preferable to provide a mechanism for controlling the piercing depth of the pin to the middle part between the pin tip and the pin root (25-75% of pin tip to the root).

As mentioned earlier, the setting position of the brush roll is adjusted to set the tip of the brush roll to a certain distance from the surface of the pin sheet, whereby the piercing depth of the film can be controlled.

In addition, a preferable embodiment of the apparatus for producing a polymer film of the present invention is use of a pin sheet having, on the outer side relative to the width direction, a part higher than a pedestal provided with the pins of pin sheets (pin pedestal), so that the film will not come into contact with the pin pedestal. It can suppress welding and heat conduction between the film and the surface of the pin sheet to be in contact therewith, whereby deformation of the film in the vicinity of the pin can be suppressed. The shape of the part higher than the pedestal, which is set on the outer side relative to the width direction of the pin sheet is not particularly limited as long as it is positioned higher than the pin pedestal where pins are planted, thereby functioning to prevent the film from coming into contact with the pin pedestal. For example, the table may contact the film only at the outer side in the width direction of the pin sheet where pins are not planted and which is made to have a greater height. Alternatively, the pin pedestal of the pin sheet may have a slant toward the outer side in the width direction.

In the case of a table, for example, the shape and size thereof are preferably that (1) the height of the table is lower than the pin tip by the range of 3-8 mm. More preferably, it is lower by the range of 4-6 mm. When the height of the table is lower than the pin tip by less than 3 mm, the depth of the pins piercing the both ends of the film is shallow, the film is unpreferably detached frequently from the pins during the subsequent heat treatment step. When the height of the table is lower than the pin tip by not less than 8 mm, it unpreferably causes a great resistance in removing the film from the pin sheets after the heat treatment, which may lead to tearing of the both ends of the film in the worst case.

In addition, (2) the height of the table is preferably greater by the range of 1-5 mm than that of the pedestal where the pins are set. More preferably, it is higher by the range of 2-3 mm. When the film is held by pin sheets, the pin insertion depth of the film is stably determined by the hold down brush roll, a direct heat transfer suppressive effect from the pin sheet to the gripped portion of the film is expressed, which in turn minimizes the temperature difference between the film center portion and the gripped portion and difference in the breaking strength during film feeding. As a result, troubles such as film breakage and the like in the tenter, and during detachment of the film from the pin sheets after a heat treatment in the tenter can be reduced. In contrast, when the table is higher by less than 1 mm than the pedestal where pins are set, the direct heat transfer suppressive effect from the pin sheet to the gripped portion of the film decreases, which in turn increases the temperature difference between the film center portion and the gripped portion, and difference in the breaking strength during film feeding. As a result, troubles such as film breakage and the like in the tenter can be unpreferably caused. In addition, when the table is higher by more than 5 mm than the pedestal where pins are set, contamination of the pin sheets themselves in the heat treatment step is unpreferably accelerated.

In addition, (3) the periphery of the table is preferably chamfered. Without a chamfer processing, the film in contact with the periphery of the table is preferably torn.

In addition, (4) the pedestal provided with the pins preferably has a cavity. This has a direct heat transfer suppressive effect from the pin sheet to the film. As a result, the temperature difference between the film center portion and the gripped portion and difference in the breaking strength during film feeding become small, which is effective for the prevention of troubles such as film breakage and the like in the tenter. The cavity area in the pin pedestal is preferably 10-50% of the whole pin pedestal provided with the pins. When it is less than 10%, the effect thereof is hardly expressed and, when it exceeds 50%, the mechanical stability of the pin sheet per se, such as maintenance of flatness and the like, shows unpreferable phenomena. These preferable pin sheets are shown, for example, in FIG. 11 and FIG. 13.

Moreover, a preferable embodiment of the apparatus for producing a polymer film of the present invention is one wherein a cavity in the width direction is formed in a part higher than the pin pedestal provided on the outer side in the width direction of the pin sheet. It has a direct heat transfer suppressive effect from the part higher than the pin pedestal to the film and deformation of the film in the vicinity of the pin can be suppressed. As a result, the temperature difference between the film center portion and the gripped portion and difference in the breaking strength during film feeding become small, which is effective for the prevention of troubles such as film breakage and the like in the tenter. The total sectional area of the cavity formed in the part higher than the pin pedestal provided on the outer side in the width direction of the pin sheet is preferably 20-80% of the total sectional area of the part higher than the pin pedestal provided on the outer side in the width direction of the pin sheet. When it is less than 20%, its effect is hardly expressed and, when it exceeds 80%, the mechanical stability of the pin pedestal per se provided on the outer side in the width direction of the pin sheet, such as maintenance of the distance between the film and the pin pedestal and the like, shows unpreferable phenomena.

Figure 14:
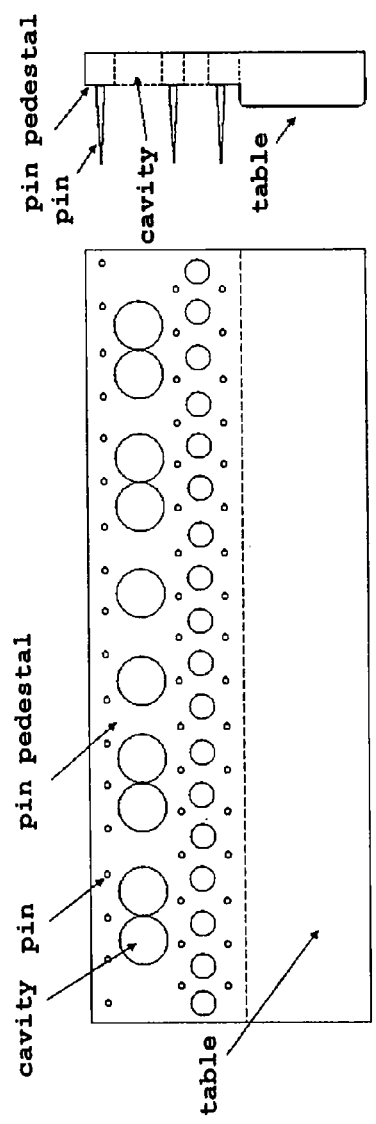
FIG. 14 shows an outline of a pin sheet wherein a table is provided on the outer side in the width direction of the pin to be in contact with the film and the pedestal of the pin has a cavity in the tenter type film processing machine of the present invention.

These preferable pin sheets are shown, for example, in FIG. 14 and FIG. 16.

In addition, a preferable embodiment of the apparatus for producing a polymer film of the present invention is an apparatus comprising a pin sheet having, on the outer side relative to the width direction, a part higher than a pin pedestal, wherein the distance between the part and the pin arranged at the outermost part in the width direction on the pedestal of the pin sheet is 2-10 mm, and a pin density (P) satisfying the following formula (1):

$$2/(t+70) \leq P \leq 8/(t+70) \tag{1}$$

wherein t is a film thickness (μm) after tenter processing, and P is a density (pins/mm$^2$) of the pins relative to the total area of the pedestal provided with the pins other than the table provided on the outer side relative to the width direction of the pin sheet (a part higher than the pin pedestal).

Using a pin sheet having, on the outer side relative to the width direction, a part higher than a pedestal provided with the pins of pin sheets (pin pedestal), so that the film will not come into contact with the pin pedestal, welding and heat conduction between the film and the surface of the pin sheet to be in contact therewith can be suppressed, whereby deformation of the film in the vicinity of the pin can be suppressed. However, when the distance between the part higher than the pin pedestal provided on the outer side relative to the width direction of the pin sheet and the pin arranged at the outermost part in the width direction on the pedestal of the pin sheet is less than 2 mm, the vicinity of pin piercing provided at the outermost part in the width direction contacts the part higher than the pin pedestal provided on the outer side relative to the width direction of the pin sheet. Therefore, the film sometimes tends to tear easily during detachment of the film from the pin sheets after a heat treatment. In addition, when the distance between the part higher than the pin pedestal provided on the outer side relative to the width direction of the pin sheet and the pin arranged at the outermost part in the width direction on the pedestal of the pin sheet is greater than 10 mm, a substantially wide film is used to control the film height with the brush roll and the part higher than the pin pedestal provided on the outer side relative to the width direction of the pin sheet, which may degrade the yield. In addition, in the above-mentioned formula (1), when P is less than 2/(t+70), the pin sheet pedestal and the film are subjected to a contactless heat treatment at a high temperature for prevention of welding of the film and the pin sheet and the like. In this case, a heat shrink stress on the pin vicinity increases. Thus, when the thickness is particularly small, the film is sometimes easily torn, which is unpreferable. In addition, in the above-mentioned formula (1), when P is greater than 8/(t+70), the distance between adjacent pins becomes narrow, and therefore, the film sometimes tends to tear easily during detachment of the film from the pin sheets after the heat treatment.

A more preferable embodiment is the above-mentioned apparatus for producing a polymer film, wherein, as the longitudinal arrangement of the pins to be provided on the pin pedestal, the distance $L_M$ (mm) of the adjacent pins relative to the feeding direction of the pin sheet is 2-8 times the diameter d (mm) of the pins for piercing the film, and the pin sheet comprises at least two rows of pin longitudinal arrangements.

In the pin transverse arrangements to be provided on the pin pedestal, when the shortest distance $L_t$ (mm) between adjacent pins relative to the width direction of the pin sheet, and in the pin longitudinal arrangements to be provided on the pin pedestal, when the distance $L_M$ (mm) between adjacent pins relative to the feeding direction of the pin sheet, are less than twice the diameter d (mm) of the pins for piercing the film, the distance between the adjacent pins becomes narrow, and the film sometimes tends to tear easily during detachment of the film from the pin sheets after the heat treatment, which is unpreferable. In addition, in the pin transverse arrangements to be provided on the pin pedestal, when the shortest distance $L_t$ (mm) between adjacent pins relative to the width direction of the pin sheet, and in the pin longitudinal arrangements to be provided on the pin pedestal, when the distance $L_M$ (mm) between adjacent pins relative to the feeding direction of the pin sheet, are greater than 8 times the diameter d (mm) of the pins for piercing the film, the pin sheet pedestal and the film are subjected to a contactless heat treatment at a high temperature for prevention of welding of the film and the pin sheet and the like. In this case, a heat shrink stress on the pin vicinity increases. Thus, when the thickness is particularly small, the film is sometimes easily torn, which is unpreferable. In addition, when the pin sheet comprises only one row of pin longitudinal arrangement, the pin sheet pedestal and the film are subjected to a contactless heat treatment at a high temperature for prevention of welding of the film and the pin sheet and the like. In this case, a heat shrink stress on the pin vicinity increases or the film is greatly influenced by curling at the outermost end portions. Thus, the film is sometimes easily torn, which is unpreferable.

When a treatment is performed in a tenter using the apparatus for producing a polymer film of the present invention, the film ends are preferably held on pin sheets such that the position of the end in the width direction of the film will be 5-25 mm outside the outermost part in the width direction of the pins provided on the pin sheets. When the distance between the position of the end in the width direction of the film and the outermost part in the width direction of the pins provided on the pin sheets is less than 5 mm, the ear portion is unpreferably torn during detachment of the film from the pin sheets after the heat treatment, which is due to deformation such as curling and the like developed to become resistance by the heat shrinkage at the outermost end in the film width direction. When the distance between the position of the end in the width direction of the film and the outermost part in the width direction of the pins provided on the pin sheets exceeds 25 mm, the yield is degraded, which is unpreferable for production. The shape of the part higher than the pin pedestal provided on the outer side relative to the width direction of the pin sheet is not particularly limited as long as it is positioned higher than the pin pedestal where pins are planted, thereby functioning to prevent the film from coming into contact with the pin pedestal. For example, the table may contact the film only at the outer side in the width direction of the pin sheet where pins are not planted and which is made to have a greater height. Alternatively, the pin pedestal of the pin sheet may have a slant toward the outer side in the width direction. In the case of a table, for example, the shape and size thereof are preferably that (1) the height of the table is lower than the pin tip by the range of 3-8 mm. More preferably, it is lower by the range of 4-6 mm. When the height of the table is lower than the pin tip by less than 3 mm, the depth of the pins piercing the both ends of the film is shallow, the film is unpreferably detached frequently from the pins during the subsequent heat treatment step. When the height of the table is lower than the pin tip by more than 8 mm, it unpreferably causes a great resistance in removing the film from the pin sheets after the heat treatment, which may lead to tearing of the both ends of the film in the worst case.

As mentioned earlier, the gripped portion in the pin tenter of the present invention is constituted by a number of pin sheets and a number of pins provided on individual pin sheets.

When the tenter type processing part in the present invention is a heat treatment furnace, the wind speed in the heat treatment furnace is preferably from 0.1 m/sec to 3.0 m/sec. In the present invention, the wind speed in the heat treatment furnace is preferably not more than 3 m/sec, more preferably 2 m/min. The lower limit of the wind speed in the present invention is 0.1 m/sec, preferably about 0.3 m/sec. Moreover, the air pressure is preferably applied uniformly from the both surfaces of the film held in the present invention. When the wind speed exceeds a given range, or the air pressure from the both surfaces of the film is nonuniform, the film may be released from the pins, or the film may be pressed down more than necessary to contact the pin sheets, whereby the film is heated by the pin sheets more than necessary to cause film breakage and the like. On the other hand, when the wind speed is less than the lower limit, renewal of the atmosphere of the film surface becomes insufficient, whereby progress of the desired drying and chemical reactions in the heat treatment furnace may be prevented unpreferably.

EXAMPLES

The present invention is explained in more detail in the following by referring to Examples and Comparative Examples, which are not to be construed as limitative. The property evaluation methods in the following Examples are as follows.

1. Reduced Viscosity ($\eta sp/C$) of Polyamic Acid

A solution of a polymer dissolved in N-methyl-2-pyrrolidone (or N,N-dimethylacetamide) to a concentration of 0.2 g/dl was measured with a Ubbelohde viscosity tube at 30° C. (When the solvent used for preparation of the polyamic acid solution was N,N-dimethylacetamide, the polymer was dissolved therein and measured.)

2. Film Thickness

The thickness was measured using a micrometer (manufactured by FEINPRUF, Millitron 1254D).

3. Tensile Modulus, Tensile Strength at Break and Tensile Elongation at Break of Film A polyimide film to be the measurement target was cut out in the machine direction (MD direction) and the transverse direction (TD direction) in a 100 mm×10 mm rectangular strip and used as a test piece. Using a tensile tester (manufactured by Shimadzu Corporation, Autograph (trade name), name: AG-5000A), tensile modulus, tensile strength at break and tensile elongation at break were measured under the conditions of tensile rate (50 mm/min), distance between chucks (40 mm) in both MD direction and TD direction. The tensile modulus in the length direction of the bristle material forming the brush was also measured in the same manner.

4. Linear Expansion Coefficient (CTE) of Polyimide Film

The measurement target film was measured for the expansion and/or contraction rate in the MD direction and TD direction under the following conditions, the expansion and/or contraction rate/temperature was measured at 15° C. intervals of 30° C.-45° C., 45° C.-60° C. and so on, the measurement was performed up to 300° C. and an average of all measurement values was calculated as CTE. The MD direction and TD direction mean the same as in the measurement of the above-mentioned "3.".

Name of apparatus; TMA4000S manufactured by MAC Science
  sample length; 20 mm
  sample width; 2 mm
  temperature rise start temperature; 25° C.
  temperature rise end temperature; 400° C.
  temperature rise rate; 5° C./min
  atmosphere; argon 5. Melting Point and Glass Transition Temperature of Film The measurement target film was subjected to differential scanning calorimetry (DSC) under the following conditions, and the melting point (melting peak temperature Tpm) and glass transition point (Tmg) were determined according to JIS K 7121. The melting point of the bristle material forming the brush was also measured in the same manner.

Name of apparatus; DSC3100S manufactured by MAC Science
  pan; aluminum pan (non-airtight type)
  sample mass; 4 mg
  temperature rise start temperature; 30° C.
  temperature rise end temperature; 600° C.
  temperature rise rate; 20° C./min
  atmosphere; argon 6. Thermal Decomposition Temperature of Film The measurement target film was thoroughly dried and used as a sample. The sample was subjected to a thermogravimetric analysis (TGA) under the following conditions, and the temperature at which the sample mass decreased by 5% was taken as a thermal decomposition temperature.

Name of apparatus; TG-DTA2000S manufactured by MAC Science
  pan; aluminum pan (non-airtight type)
  sample mass; 10 mg
  temperature rise start temperature; 30° C.
  temperature rise rate; 20° C./min
  atmosphere; argon 7. Measurement of Surface Roughness The surface roughness was measured using a surface roughness tester HANDYSURF E-35A (manufactured by TOKYO SEIMITSU CO., LTD.).

Reference Example 1

(Predispersion of Inorganic Particles)

Amorphous silica spherical particles SEAHOSTAR KE-P10 (manufactured by NIPPON SHOKUBAI CO., LTD., 1.22 parts by mass) and N-methyl-2-pyrrolidone (420 parts by mass) were placed in a container in which a part in contact with a liquid and an infusion piping were made of austenite stainless steel SUS316L and stirred with homogenizer T-25 Basic (manufactured by IKA Labor technik) at 1000 rpm/min for 1 min to give a predispersion liquid. The average particle size in the predispersion liquid was 0.11 µm.

(Preparation of Polyamic Acid Solution)

A reaction container equipped with a nitrogen inlet tube, a thermometer, a stirrer bar, where a part in contact with a liquid and an infusion piping were made of austenite stainless steel SUS316L was substituted with nitrogen, and 223 parts by mass of 5-amino-2-(p-aminophenyl)benzoxazole was placed therein. Then, 4000 parts by mass of N-methyl-2-pyrrolidone was added. After complete dissolution, the predispersion liquid (420 parts by mass) obtained earlier and 217 parts by mass of pyromellitic dianhydride were added. The mixture was stirred at 25° C. for 24 hr to give a brown viscous polyamic acid solution A. The reduced viscosity ($\eta sp/C$) thereof was 3.8 dl/g.

Reference Example 2

A reaction container equipped with a nitrogen inlet tube, a thermometer, a stirrer bar, where a part in contact with a liquid and an infusion piping were made of austenite stainless steel SUS316L was substituted with nitrogen, and 5-amino-2-(p-aminophenyl)benzoxazole (223 parts by mass) and N,N-dimethylacetamide (4416 parts by mass) were placed therein. After complete dissolution, SNOWTEX DMAC-ST30 wherein colloidal silica was dispersed in dimethylacetamide (manufactured by NISSAN CHEMICAL INDUSTRIES, LTD., 40.5 parts by mass, containing 8.1 parts by mass of silica) and pyromellitic dianhydride (217 parts by mass) were added. The mixture was stirred at a reaction temperature of 25° C. for 24 hr to give a brown viscous polyamic acid solution B. The $\eta sp/C$ thereof was 4.0 dl/g.

Reference Example 3

(Predispersion of Inorganic Particles)

Amorphous silica spherical particles SEAHOSTAR KE-P10 (manufactured by NIPPON SHOKUBAI CO., LTD., 7.6 parts by mass) and N-methyl-2-pyrrolidone (390 parts by mass) were placed in a container in which a part in contact with a liquid and an infusion piping were made of austenite stainless steel SUS316L and stirred with homogenizer T-25 Basic (manufactured by IKA Labor technik) at 1000 rpm/min for 1 min to give a predispersion liquid.
(Preparation of Polyamic Acid Solution)

A reaction container equipped with a nitrogen inlet tube, a thermometer, a stirrer bar, where a part in contact with a liquid and an infusion piping were made of austenite stainless steel SUS316L was substituted with nitrogen, and 200 parts by mass of diaminodiphenylether was placed therein. Then, 3800 parts by mass of N-methyl-2-pyrrolidone was added. After complete dissolution, the predispersion liquid (390 parts by mass) obtained earlier and 217 parts by mass of pyromellitic dianhydride were added. The mixture was stirred at 25° C. for 5 hr to give a brown viscous polyamic acid solution C. The reduced viscosity ($\eta$sp/C) thereof was 3.7 dl/g.

Reference Example 4

(Predispersion of Inorganic Particles)

Amorphous silica spherical particles SEAHOSTAR KE-P10 (manufactured by NIPPON SHOKUBAI CO., LTD., 3.7 parts by mass) and N-methyl-2-pyrrolidone (420 parts by mass) were placed in a container in which a part in contact with a liquid and an infusion piping were made of austenite stainless steel SUS316L and stirred with homogenizer T-25 Basic (manufactured by IKA Labor technik) at 1000 rpm/min for 1 min to give a predispersion liquid.
(Preparation of Polyamic Acid Solution)

A reaction container equipped with a nitrogen inlet tube, a thermometer, a stirrer bar, where a part in contact with a liquid and an infusion piping were made of austenite stainless steel SUS316L was substituted with nitrogen, and 108 parts by mass of phenylenediamine was placed therein. Then, 3600 parts by mass of N-methyl-2-pyrrolidone was added. After complete dissolution, the predispersion liquid (420 parts by mass) obtained earlier and 292.5 parts by mass of diphenyltetracarboxylic dianhydride were added. The mixture was stirred at 25° C. for 12 hr to give a brown viscous polyamic acid solution D. The reduced viscosity ($\eta$sp/C) thereof was 4.5 dl/g.

Examples 1-4

The polyamic acid solutions obtained in Reference Examples 1-4 were applied to a lubricant-free surface of polyethylene terephthalate film A-4100 (manufactured by Toyobo Co., Ltd.) with a comma coater (gap 150 μm, coating width 1240 mm), and dried at 90° C. for 60 min. After drying, the self-supportive polyamic acid film was released from the support and cut at both ends to give each green film with thickness 21 μm, width 1200 mm.

These obtained green films were passed through a pin tenter (FIG. 2) having pin sheets with pins arranged thereon so that the distance between the pins will be uniform when, as shown in FIG. 1, the pin sheets are lined up, and a cooling mechanism for cooling the pins and pin sheets with water immediately before piercing with the pins. The distance between the pin sheets was 1140 mm, or 30 mm each of the both ends of the green film was pierced with the pins, and the film was subjected to two-stage heating (first stage 200° C. for 5 min, temperature was raised at a temperature rise rate of 4° C./sec, second stage 450° C. for 5 min) to allow an imidation reaction to proceed. The temperature of the pins and the pin sheets immediately before piercing with the pins was controlled within the range of 150° C.±8° C.

The film feeding condition was good, and release from the pins did not occur in the tenter. The film tear width in the pin piercing part at the tenter outlet was within about 1 mm.

The obtained film was cooled to room temperature, the both ends of the film where flatness was poor were cut off with a slitter, and the film was wound in a roll to give respective brown polyimide films of Examples 1-4. The measurement results such as property and the like of the obtained polyimide films are shown in Table 1. The length of the pin sheet was 65.0 mm, and the pin distance was 7.0 mm.

The flatness and the effective width of the film were defined as follows.

First, the obtained film was spread on a surface plate with a clean surface, and an uneven film end producing a space between the film and the surface plate was taken as a flatness failure. The both ends of the film were cut until the film end did not rise from the surface of the surface plate and the whole film came into close contact with the surface plate. The film width at that time was defined as an effective width.

Comparative Examples 1-4

The film forming and evaluation were performed in the same manner as in Example 1. However, in the Comparative Examples, the pins and the pin sheets were not cooled. During film forming, the temperature of the pins and the pin sheets changed in the range of about 205° C.±12° C.

Thereafter, in the same manner as in Example 1, the both ends of the film where flatness was poor were cut off with a slitter, and the film was wound in a roll to give respective brown polyimide films of Comparative Examples 1-4. The results such as property and the like of the obtained polyimide films are shown in Table 1.

Examples 5-12

In the following, the film forming and evaluation were performed in the same manner as in Example 1 by changing the temperature of the pins and the pin sheets. The results are shown in Table 2.

As shown in the results, in the Comparative Examples, release from the pins easily occurred, pin tearing was large, and the width of the film end where flatness was poor was wide, which in turn narrowed the effective width.

TABLE 1

|  |  |  | Example/Comparative Example |  |  |  |  |  |  |  |
|---|---|---|---|---|---|---|---|---|---|---|
|  |  |  | Ex. 1 | Ex. 2 | Ex. 3 | Ex. 4 | Com. Ex. 1 | Com. Ex. 2 | Com. Ex. 3 | Com. Ex. 4 |
| polyamic acid |  |  | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin temperature | center value | ° C. | 150 | 150 | 150 | 150 | 205 | 205 | 205 | 205 |
|  | shift range | ° C. | ±7 | ±7 | ±7 | ±7 | ±12 | ±12 | ±12 | ±12 |

TABLE 1-continued

|  |  |  | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|---|---|
| effective width |  | mm | 1110 | 1110 | 1120 | 1110 | 1050 | 1000 | 1020 | 1030 |
| release from pin |  | Yes/no | no | no | no | no | yes | yes | yes | yes |
| pin tear width |  | mm | 1 | 1 | 0 | 1 | 5 | 4 | 6 | 6 |
| thickness | L side | mm | 10.4 | 9.6 | 9.8 | 10.4 | 10.7 | 9.9 | 9.5 | 10.8 |
|  | center | mm | 10.7 | 9.5 | 9.9 | 9.2 | 9.8 | 10.7 | 9.3 | 9.8 |
|  | R side | mm | 11.0 | 9.2 | 10.7 | 9.7 | 9.8 | 9.6 | 9.4 | 9.5 |
|  | average | mm | 9.4 | 10.3 | 10.1 | 10.1 | 10.4 | 9.9 | 9.0 | 9.3 |
| tensile strength at break | MD | MPa | 354 | 333 | 328 | 344 | 402 | 283 | 242 | 350 |
|  | TD |  | 339 | 296 | 343 | 301 | 305 | 301 | 246 | 332 |
| tensile modulus | MD | GPa | 7 | 7 | 9 | 7 | 9 | 8 | 4 | 8 |
|  | TD |  | 7 | 7 | 10 | 8 | 7 | 7 | 4 | 8 |
| tensile elongation at break | MD | % | 35 | 50 | 45 | 42 | 34 | 40 | 62 | 50 |
|  | TD |  | 33 | 47 | 53 | 54 | 33 | 36 | 59 | 36 |
| CTE | MD | ppm/K | 6 | 3 | 3 | 15 | 6 | 3 | 26 | 16 |
|  | TD |  | 6 | 2 | 2 | 14 | 5 | 5 | 29 | 18 |
| melting point |  | °C. | none | none | none | none | none | none | none | none |
| glass transition temperature |  |  | none | none | none | none | none | none | none | none |
| thermal decomposition temperature |  |  | 610 | 610 | 595 | 610 | 610 | 610 | 590 | 610 |

TABLE 2

|  |  |  | Ex. 5 | Ex. 6 | Ex. 7 | Ex. 8 | Ex. 9 | Ex. 10 | Ex. 11 | Ex. 12 |
|---|---|---|---|---|---|---|---|---|---|---|
| polyamic acid |  |  | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin temperature | center value | °C. | 120 | 120 | 120 | 120 | 170 | 170 | 170 | 170 |
|  | shift range | °C. | ±6 | ±6 | ±6 | ±6 | ±8 | ±8 | ±8 | ±8 |
| effective width |  | mm | 1110 | 1110 | 1120 | 1110 | 1100 | 1100 | 1100 | 1090 |
| release from pin |  | Yes/no | no | no | no | no | no | no | no | no |
| pin tear width |  | mm | 1 | 1 | 1 | 1 | 2 | 1 | 2 | 1 |
| thickness | L side | mm | 9.9 | 9.9 | 9.8 | 10.8 | 10.3 | 9.9 | 10.0 | 10.2 |
|  | center | mm | 10.6 | 9.6 | 9.9 | 10.1 | 10.0 | 10.3 | 10.3 | 9.6 |
|  | R side | mm | 10.4 | 9.5 | 9.6 | 9.9 | 9.5 | 9.8 | 10.4 | 10.2 |
|  | average | mm | 9.5 | 10.3 | 9.5 | 9.5 | 10.5 | 9.9 | 9.6 | 10.3 |
| tensile strength at break | MD | MPa | 348 | 322 | 235 | 343 | 382 | 302 | 330 | 339 |
|  | TD |  | 340 | 314 | 236 | 344 | 325 | 295 | 330 | 302 |
| tensile modulus | MD | GPa | 8 | 8 | 4 | 8 | 8 | 7 | 9 | 7 |
|  | TD |  | 9 | 8 | 4 | 8 | 7 | 7 | 9 | 7 |
| tensile elongation at break | MD | % | 33 | 44 | 63 | 47 | 31 | 35 | 47 | 49 |
|  | TD |  | 33 | 46 | 58 | 42 | 30 | 34 | 45 | 52 |
| CTE | MD | ppm/K | 6 | 3 | 25 | 18 | 5 | 3 | 3 | 17 |
|  | TD |  | 7 | 2 | 25 | 17 | 4 | 4 | 2 | 16 |
| melting point |  | °C. | none | none | none | none | none | none | none | none |
| glass transition temperature |  |  | none | none | none | none | none | none | none | none |
| thermal decomposition temperature |  |  | 610 | 610 | 590 | 610 | 610 | 610 | 595 | 610 |

Examples 13-16

Figure 3:
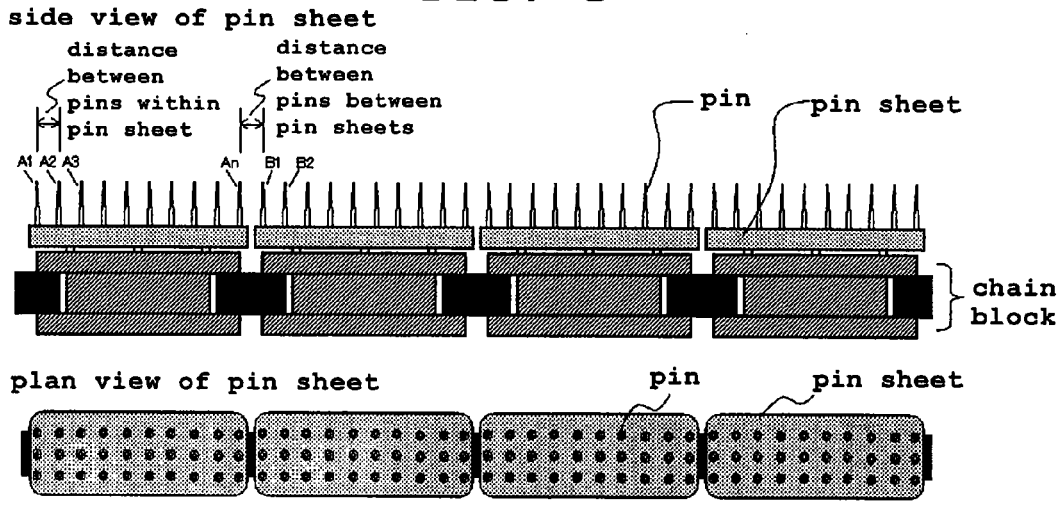
FIG. 3 shows an outline example of the gripper of the tenter type film processing machine of the present invention.

The green films (thickness 21 μm, width 1200 mm) obtained in the same manner as in Example 1 from the polyamic acid solutions obtained in Reference Examples 1-4 were passed through a pin tenter having pin sheets with pins arranged thereon so that the distance between the pins will be uniform when, as shown in FIG. 3, the pin sheets are lined up. The distance between the pin sheets was 1140 mm, or 30 mm each of the both ends of the green film was pierced with the pins, and the film was subjected to two-stage heating (first stage 200° C. for 5 min, temperature was raised at a temperature rise rate of 4° C./sec, second stage 450° C. for 5 min) to allow an imidation reaction to proceed. Thereafter, the film was cooled to room temperature in 5 min, the both ends of the film where flatness was poor were cut off with a slitter, and the film was wound in a roll to give respective brown polyimide films of Examples 13-16. The measurement results such as property and the like of the obtained polyimide films are shown in Table 3. The length of the pin sheet was 65.0 mm, and the pin distance was 7.0 mm.

Comparative Examples 5-8

The green films obtained in the same manner as in Example 13 were held at the both ends in the pin tenter containing pin sheets, as shown in FIG. 4, and heat-treated under the conditions as in Example 13, the both ends of the film where flatness was poor were cut off with a slitter, and the film was wound in a roll to give respective brown polyimide films of Comparative Examples 5-8. The results such as property and the like of the obtained polyimide films are shown in Table 3. The length of the pin sheet was 63.0 mm, the pin distance was 7.0 mm and the distance between pins of pin sheets was 14.0 mm.

As the results show, in Comparative Examples 5-8, the width of the film end where flatness was poor was wide, which in turn narrowed the effective width. In addition, the difference in the film thickness between right and left was large, suggesting that the uniformity of the film was not good.

Using a pin tenter wherein the distance between the pins is equal even when the distance crosses over pin sheets, film forming with a wide effective width and less uselessness is enabled, and the obtained film is superior in the quality in the width direction and uniformity in the film thickness.

temperature was raised at a temperature rise rate of 4° C./sec, second stage 450° C. for 5 min) was applied to allow an imidation reaction to proceed. Thereafter, the film was cooled to room temperature in 5 min, the both ends of the film where flatness was poor were cut off with a slitter, and the film was wound in a roll to give respective brown polyimide films of Examples 17-20. The feeding state during heat treatment and the measurement results such as property and the like of the obtained polyimide films are shown in Table 4.

Comparative Examples 9-12

The green films obtained in the same manner as in Example 17 were held at the both ends in a pin tenter wherein needle pins were planted on the surface of the mirror-processed pin sheets, as shown in FIG. 6, heat-treated under the conditions as in Example 17, the both ends of the film where flatness was poor were cut off with a slitter, and the film was wound in a roll to give respective brown polyimide films of Comparative Examples 9-12. The feeding state during heat treatment and the results such as property and the like of the obtained polyimide films are shown in Table 4. Ra of the surface of the surface-processed pin sheets was 0.13 μm.

TABLE 3

| | | | Example/Comparative Example | | | | | | | |
|---|---|---|---|---|---|---|---|---|---|---|
| | | | Ex. 13 | Ex. 14 | Ex. 15 | Ex. 16 | Com. Ex. 5 | Com. Ex. 6 | Com. Ex. 7 | Com. Ex. 8 |
| polyamic acid | | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin sheet | | | FIG. 1 | FIG. 1 | FIG. 1 | FIG. 1 | FIG. 2 | FIG. 2 | FIG. 2 | FIG. 2 |
| effective width | | mm | 1110 | 1110 | 1120 | 1110 | 1050 | 1000 | 1020 | 1030 |
| thickness | L side | mm | 10.2 | 10.2 | 10.1 | 9.9 | 10.2 | 9.7 | 10.1 | 10.2 |
| | center | mm | 10.1 | 10.2 | 10.0 | 9.9 | 9.8 | 10.2 | 9.8 | 10.0 |
| | R side | mm | 10.0 | 10.1 | 10.1 | 10.0 | 9.4 | 9.8 | 9.6 | 9.7 |
| | average | mm | 10.1 | 10.2 | 10.1 | 10.0 | 9.9 | 10.0 | 9.8 | 9.9 |
| tensile strength at break | MD | MPa | 367 | 314 | 330 | 339 | 369 | 297 | 227 | 333 |
| | TD | | 362 | 316 | 335 | 291 | 326 | 302 | 224 | 337 |
| tensile modulus | MD | GPa | 8 | 8 | 9 | 7 | 8 | 7 | 4 | 9 |
| | TD | | 9 | 8 | 9 | 7 | 8 | 7 | 4 | 8 |
| tensile elongation at break | MD | % | 32 | 45 | 48 | 46 | 31 | 33 | 66 | 45 |
| | TD | | 33 | 48 | 44 | 51 | 32 | 36 | 60 | 43 |
| CTE | MD | ppm/K | 6 | 3 | 3 | 17 | 5 | 3 | 27 | 19 |
| | TD | | 7 | 2 | 2 | 16 | 4 | 5 | 27 | 17 |
| melting point | | ° C. | none | none | none | none | none | none | none | none |
| glass transition temperature | | | none | none | none | none | none | none | none | none |
| thermal decomposition temperature | | | 610 | 610 | 595 | 610 | 610 | 610 | 590 | 610 |

Examples 17-20

Using a pin tenter wherein pins were planted in matte-processed pin sheets as shown in FIG. 5, the green films (thickness 21 μm, width 1200 mm) obtained in the same manner as in Example 1 from the polyamic acid solutions obtained in Reference Examples 1-4 were held by inserting pins into the holes made in the films and subjected to a heat treatment in the tenter. The pins were arranged in such a manner that the distance between the pins would be uniform when the pin sheets were lined up, where the pin height was 12 mm and the distance between pin sheets was 1140 mm.

The matte processing was performed by a sandblast treatment, where the surface roughness Ra was 11.5 μm.

The setting of the heat treatment of the tenter was as follows. A two-stage heating (first stage 200° C. for 5 min, As the results show, in Comparative Examples 9-12, the width of the film end where flatness was poor was wide, which in turn narrowed the effective width. In addition, the difference in the film thickness between right and left is large, suggesting that the uniformity of the film is not good.

Examples 21-24

The polyamic acid solutions obtained in Reference Examples 1-4 were applied to a stainless steel endless belt with a die coater (coating width 1240 mm), and dried at 110° C. for 40 min. After drying, the self-supportive polyamic acid film was released from the support and cut at both ends to give each green film with thickness 43 μm, width 1200 mm.

Figure 7:
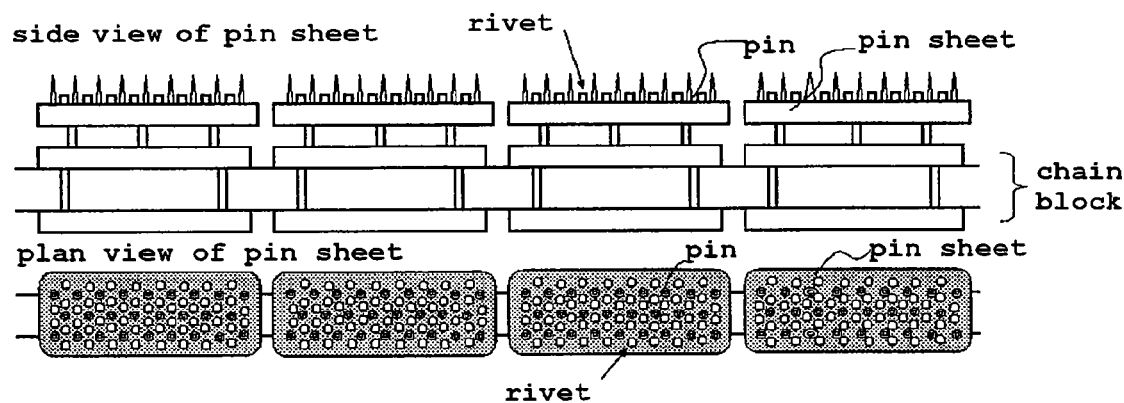
FIG. 7 shows an outline of a pin sheet with a riveted surface to be in contact with the film, which is in the tenter type film processing machine of the present invention.

These obtained green films were heat-treated under the same conditions as in Example 17 in a pin tenter containing pin sheets with concave and convex formed by hitting in rivets in the pin sheets, as shown in FIG. 7. The results are shown in Table 4. The pin height was 12 mm, and the head of the rivet was cylindrical with diameter 1.8 mm, height 2.5 mm.

temperature was raised at a temperature rise rate of 4° C./sec, second stage 450° C. for 5 min) was applied to allow an imidation reaction to proceed. The maximum wind speed in the tenter was 0.5 m/sec.

TABLE 4

| | | | Example/Comparative Example | | | | | | | | | | | |
|---|---|---|---|---|---|---|---|---|---|---|---|---|---|---|
| | | | Ex. 17 | Ex. 18 | Ex. 19 | Ex. 20 | Com. Ex. 9 | Com. Ex. 10 | Com. Ex. 11 | Com. Ex. 12 | Ex. 21 | Ex. 22 | Ex. 23 | Ex. 24 |
| polyamic acid | | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin sheet surface | | | matte | matte | matte | matte | mirror | mirror | mirror | mirror | rivet | rivet | rivet | rivet |
| film feeding state | | | good | good | good | good | good | good | release from pin | good | good | good | good | good |
| state of pin sheet surface | | | good | good | good | good | welding | welding | welding | welding | good | good | good | good |
| release from pin sheet | | | good | good | good | good | baddish | baddish | baddish | bad | good | good | good | good |
| effective width | | mm | 1120 | 1110 | 1120 | 1110 | 1050 | 980 | 1000 | 1020 | 1120 | 1120 | 1100 | 1110 |
| thickness | L side | mm | 10.2 | 10.2 | 10.1 | 9.9 | 10.2 | 9.7 | 10.1 | 10.2 | 10.2 | 9.9 | 10.1 | 9.9 |
| | center | mm | 10.1 | 10.2 | 10.0 | 9.9 | 9.8 | 10.2 | 9.8 | 10.0 | 10.0 | 10.0 | 10.0 | 10.0 |
| | R side | mm | 10.0 | 10.1 | 10.1 | 10.0 | 9.4 | 9.8 | 9.6 | 9.7 | 10.0 | 10.1 | 10.1 | 9.9 |
| | average | mm | 10.1 | 10.2 | 10.1 | 10.0 | 9.9 | 10.0 | 9.8 | 9.9 | 10.1 | 10.0 | 10.1 | 9.9 |
| tensile strength at break | MD | MPa | 302 | 262 | 279 | 358 | 392 | 327 | 214 | 330 | 300 | 266 | 390 | 400 |
| | TD | | 333 | 350 | 273 | 288 | 387 | 275 | 232 | 392 | 370 | 285 | 395 | 240 |
| tensile modulus | MD | GPa | 9.0 | 8.4 | 8.9 | 8.4 | 7.8 | 7.1 | 3.7 | 9.3 | 8.6 | 7.5 | 10.8 | 6.4 |
| | TD | | 8.4 | 8.9 | 7.8 | 7.7 | 7.7 | 6.9 | 3.4 | 7.0 | 9.7 | 8.4 | 10.3 | 7.1 |
| tensile elongation at break | MD | % | 32.8 | 38.1 | 46.0 | 51.7 | 25.4 | 35.1 | 55.9 | 49.1 | 29.4 | 48.9 | 53.0 | 46.3 |
| | TD | | 37.5 | 39.1 | 38.3 | 54.6 | 29.6 | 33.7 | 58.9 | 38.1 | 27.5 | 45.1 | 40.3 | 56.9 |
| CTE | MD | ppm | 4.9 | 3.4 | 2.9 | 16.3 | 4.1 | 4.0 | 26.0 | 20.6 | 6.3 | 3.5 | 3.3 | 14.6 |
| | TD | | 7.2 | 1.9 | 2.3 | 15.2 | 3.5 | 5.4 | 28.1 | 14.4 | 8.2 | 1.6 | 2.0 | 16.3 |
| melting point | | °C. | none | none | none | none | none | none | none | none | none | none | none | none |
| glass transition temperature | | | none | none | none | none | none | none | none | none | none | none | none | none |
| thermal decomposition temperature | | | 610 | 600 | 590 | 610 | 610 | 605 | 595 | 610 | 610 | 615 | 590 | 610 |

Examples 25-31, Comparative Examples 13-17

Green films (thickness 21 μm, width 1200 mm) were obtained in the same manner as in Example 1 from the polyamic acid solution obtained in Reference Example 1.

Figure 9:
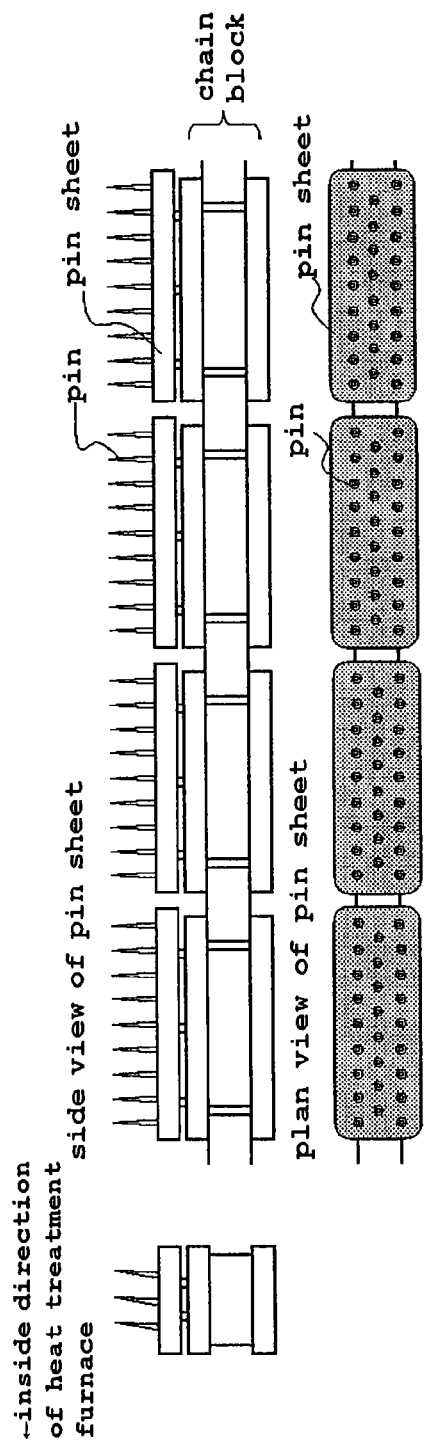
FIG. 9 is a schematic diagram of the outline of one embodiment of an angular pin sheet of the tenter type film processing machine of the present invention.

Using a pin tenter having pin sheets, wherein carbon steel pins (height 10 mm) were transversely planted relative to the film feeding direction at a slant angle of 3-13 degrees, and, as a film pressing down tool, a brush roll obtained by winding a unit brush manufactured by NIPPON UNIT CORPORATION having bristle material (thickness 0.5 mm) made by Conex, as shown in FIG. 8 and FIG. 9, the green films obtained in Examples 25-31 were held by inserting pins into the films and subjected to a heat treatment in the tenter. Using a pin tenter having pin sheets, wherein the pin angle was 0 degree or 20-30 degrees, the green films of Comparative Examples 13-17 were held by inserting pins into the films and subjected to a heat treatment in the tenter. The pins were arranged in such a manner that the distance between the pins would be uniform when the pin sheets were lined up, the distance between pin sheets was 1140 mm.

The aforementioned brush roll made by Conex was provided with a micrometer permitting adjustment of the height, so that the tip of bristle can have some distance from the pin sheet surface. In these Examples, it was adjusted to be set at 3 mm from the pin sheet. The films were pressed down nearly to that position, and held floating from the pin sheets.

The setting of the heat treatment in the tenter was as follows. A two-stage heating (first stage 200° C. for 5 min, Up to the middle point of the first stage of the tenter, the width of the pins on both ends was shortened by 2%, i.e., 98% of the initial width. In the latter stage of the first stage, the pin width was slightly widened to 99% of the initial width, widened to 102% in the temperature rise period, and further widened up to the middle point of the second stage to 103%, whereafter the films were treated at a constant width. Thereafter, the films were cooled to room temperature in 5 min, the both ends of the film where flatness was poor were cut off with a slitter, and the film was wound in a roll to give respective brown polyimide films of plural Example 25 and Comparative Example 13.

In Example 25, release from the pin did not occur during the treatment, the distance between the pin sheet and the film was almost the same as that at the initial stage of pin piercing and the running state was also good. However, in Comparative Example 13, release from the pin occurred during the treatment, and problems of fluttering and the like were developed during running.

In Examples 26-31, Comparative Examples 14-16, the wind speed in the heat treatment furnace was changed and the running state of the film was monitored. The results are shown in Tables 5, 6.

The wind speed in the Tables was measured using "Anemomaster 24-6111" (manufactured by KANOMAX), where the detection part thereof was placed right beneath the wind blast outlet for the measurement. (For measurement of the wind speed, the values obtained by operation of air blast system and driving system at ambient temperature were used. This is because use at a high temperature is problematic in view of the heat resistance of the wind speed detection part. The air blast system was controlled in compliance with the control during measurement at ambient temperature, and the value from the air blast system control value during the aforementioned measurement at ambient temperature was used for the actual wind speed.

Examples 32-35

The green films (thickness 21 μm, width 1200 mm) were each obtained in the same manner as in Example 21 from the polyamic acid solutions obtained in Reference Examples 1-4.

These obtained green films were heat-treated in the same manner as in Example 27 except that the pin tenter shown in FIG. 8 and FIG. 10 was used to give a polyimide film from each green film. The maximum wind speed in the heat treatment furnace was 1.5 m/sec.

The feeding state during heat treatment and the measurement results such as property and the like of the obtained polyimide films are shown in Table 7.

Comparative Examples 18-21

The green films (thickness 21 μm, width 1200 mm) were each obtained in the same manner as in Example 21 from the polyamic acid solutions obtained in Reference Examples 1-4.

Using the pin tenter shown in FIG. 8, these green films obtained were held at the both ends in a pin tenter wherein needle pins were planted on the surface of the mirror-processed pin sheets, heat-treated under the conditions as in Example 32, the both ends of the film where flatness was poor were cut off with a slitter, and the film was wound in a roll to give respective brown polyimide films of Comparative Examples 18-21. The feeding state during heat treatment and the results such as property and the like of the obtained polyimide films are shown in Table 7. Ra of the surface of the surface-processed pin sheet was 0.13 μm.

As the results show in Table 7, in Comparative Examples 18-21, the width of the film end where flatness was poor was wide, which in turn narrowed the effective width. In addition, the difference in the film thickness between right and left is large, suggesting that the uniformity of the film is not good.

As mentioned above, according to the present invention, the film does not stick to the pin sheet, stable feeding is possible, the film can be released smoothly from the pin sheet, the film can be fed stably to prevent easy tearing and breakage of the film, film forming with a wide effective width and less uselessness is enabled, and the obtained film is superior in the quality in the width direction and uniformity in the film thickness.

TABLE 5

| | | Example/Comparative Example | | | | | |
|---|---|---|---|---|---|---|---|
| | | Ex. 25 | Ex. 26 | Ex. 27 | Ex. 28 | Ex. 29 | Ex. 30 | Ex. 31 |
| polyamic acid used | | Ref. Ex. 1 | Ref. Ex. 1 | Ref. Ex. 1 | Ref. Ex. 1 | Ref. Ex. 1 | Ref. Ex. 1 | Ref. Ex. 1 |
| maximum wind speed | m/sec | 0.5 | 1 | 1.5 | 2.5 | 2.5 | 2.5 | 2.5 |
| pin angle | degree | 5 | 5 | 5 | 5 | 3 | 8 | 13 |
| distance between film/pin sheet | mm | 3 | 3 | 3 | 3 | 3 | 3 | 3 |
| running state | | good | good | good | good | good | good | good |
| film tearing at pin portion | | none | none | none | none | none | none | none |
| release from pin | | none | none | none | none | none | none | none |

TABLE 6

| | | Example/Comparative Example | | | | |
|---|---|---|---|---|---|---|
| | | Com. Ex. 13 | Com. Ex. 14 | Com. Ex. 15 | Com. Ex. 16 | Com. Ex. 17 |
| polyamic acid | | Ref. Ex. 1 | Ref. Ex. 1 | Ref. Ex. 1 | Ref. Ex. 1 | Ref. Ex. 1 |
| maximum wind speed | m/sec | 2.5 | 3.5 | 5 | 2.5 | 2.5 |
| pin angle | degree | 0 | 0 | 0 | 20 | 30 |
| distance between film/pin sheet | mm | 3 | 3 | 3 | 3 | 3 |
| running state | | fluttering | fluttering | fluttering | fluttering | fluttering |
| film tearing at pin portion | | none | yes | yes | yes | yes |
| release from pin | | yes | none | yes | yes | yes |

TABLE 7

| | | Example/Comparative Example | | | | | | | |
|---|---|---|---|---|---|---|---|---|---|
| | | Ex. 32 | Ex. 33 | Ex. 34 | Ex. 35 | Com. Ex. 18 | Com. Ex. 19 | Com. Ex. 20 | Com. Ex. 21 |
| polyamic acid | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| maximum wind speed | m/sec | 1.5 | 1.5 | 1.5 | 1.5 | 1.5 | 1.5 | 1.5 | 1.5 |
| pin angle | degree | 5 | 5 | 5 | 5 | 0 | 0 | 0 | 0 |
| distance between film/pin sheet | mm | 3 | 3 | 3 | 3 | 0 | 0 | 0 | 0 |
| running state | | good | good | good | good | fluttering | fluttering | fluttering | fluttering |
| film tearing at pin portion | | none | none | none | none | yes | yes | yes | yes |
| release from pin | | none | none | none | none | yes | yes | none | yes |
| effective width | mm | 1110 | 1110 | 1120 | 1110 | 990 | 1000 | 1020 | 950 |
| thickness L side | mm | 10.2 | 10.2 | 10.1 | 9.9 | 10.1 | 9.9 | 10.0 | 10.4 |
| center | mm | 10.1 | 10.2 | 10.0 | 9.9 | 9.7 | 10.0 | 9.8 | 9.8 |
| R side | mm | 10.0 | 10.1 | 10.1 | 10.0 | 9.2 | 10.1 | 9.6 | 9.7 |
| average | mm | 10.1 | 10.2 | 10.1 | 10.0 | 9.9 | 10.0 | 9.7 | 9.9 |
| tensile strength at break MD | MPa | 413 | 303 | 297 | 294 | 340 | 238 | 237 | 321 |
| TD | | 374 | 353 | 339 | 296 | 320 | 327 | 192 | 386 |
| tensile modulus MD | GPa | 7.1 | 8.9 | 4.2 | 5.9 | 8.3 | 7.6 | 3.5 | 9.3 |
| TD | | 9.4 | 6.9 | 3.1 | 7.4 | 7.6 | 5.7 | 4.2 | 8.1 |
| tensile elongation at break MD | % | 36 | 39 | 54 | 40 | 36 | 27 | 70 | 36 |
| TD | | 35 | 54 | 44 | 55 | 30 | 34 | 60 | 35 |
| CTE MD | ppm | 5 | 3 | 3 | 17 | 4 | 3 | 27 | 22 |
| TD | | 6 | 2 | 2 | 14 | 4 | 5 | 32 | 15 |
| melting point | °C. | none | none | none | none | none | none | none | none |
| glass transition temperature | | none | none | none | none | none | none | none | none |
| thermal decomposition temperature | | 610 | 610 | 595 | 610 | 610 | 610 | 590 | 610 |

Examples 36-39

The green films (thickness 21 μm, width 1200 mm) were each obtained in the same manner as in Example 1 from the polyamic acid solutions obtained in Reference Examples 1-4.

Figure 11:
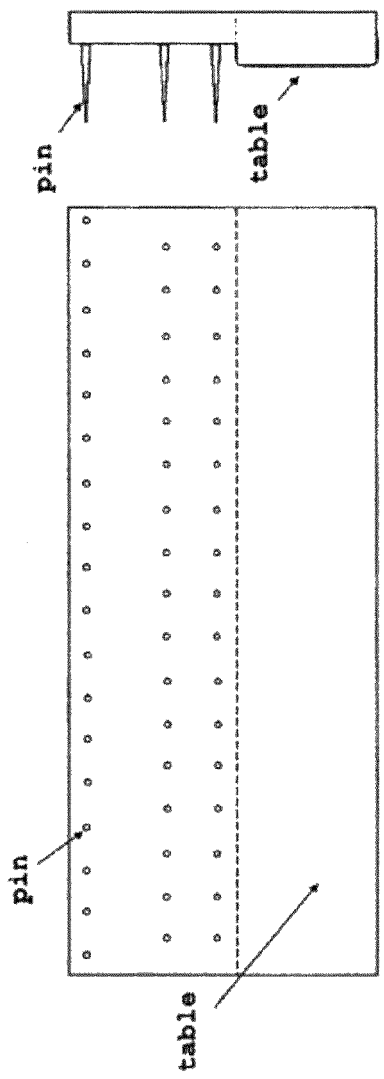
FIG. 11 shows an outline of a pin sheet with a table set on the outer side in the width direction of the pin to be in contact with the film, which is in the tenter type film processing machine of the present invention.

These obtained green films were passed through a pin tenter wherein pins were planted on the pin sheets with a table set at the outer side of the width direction, as shown in FIG. 11 to perform a heat treatment. The pins were arranged in such a manner that the distance between the pins would be uniform when the pin sheets were lined up, where the pin height from the pin pedestal was 8 mm, the height of the table set at the outer side in the width direction of the pin sheet was 2 mm higher than the pin pedestal and 6 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered.

The setting of the heat treatment in the tenter was as follows. A two-stage heating (first stage 200° C. for 5 min, temperature was raised at a temperature rise rate of 4° C./sec, second stage 450° C. for 5 min) was applied to allow an imidation reaction to proceed. Thereafter, the film was cooled to room temperature in 5 min, the both ends of the film where flatness was poor were cut off with a slitter, and the film was wound in a roll to give respective brown polyimide films of Examples 36-39. The feeding state during heat treatment and the measurement results such as property and the like of the obtained polyimide films are shown in Table 8.

The flatness and the effective width of the film were defined as follows.

First, the obtained film was spread on a surface plate with a clean surface, and an uneven film end producing a space between the film and the surface plate was taken as a flatness failure. The both ends of the film were cut until the film end did not rise from the surface of the surface plate and the whole film came into close contact with the surface plate. The film width at that time was defined as an effective width.

Comparative Examples 22-25

The green films (thickness 21 μm) were each obtained in the same manner as in Example 1 from the polyamic acid solutions obtained in Reference Examples 1-4.

Figure 12:
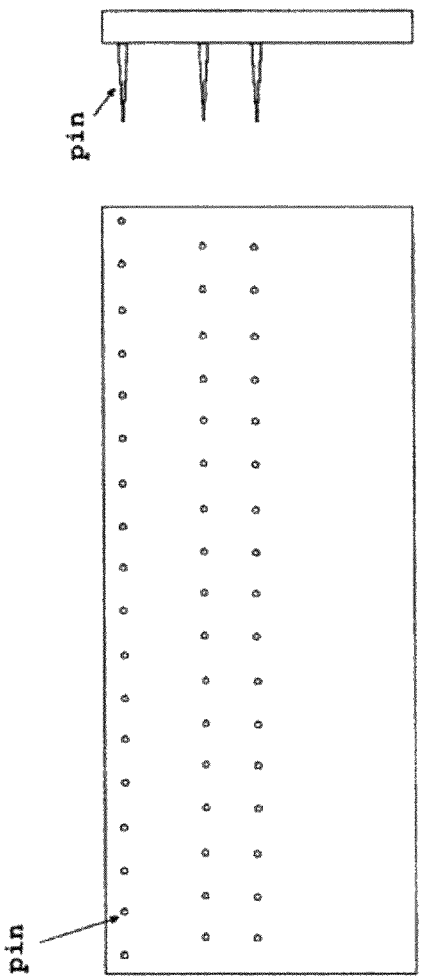
FIG. 12 shows an outline of a pin sheet to be in contact with the film, which is in a conventional tenter type film processing machine.

These green films obtained were held at the both ends in a pin tenter wherein needle pins were planted on the pin sheets free of a table, as shown in FIG. 12, heat-treated under the conditions as in Example 36, the both ends of the film where flatness was poor were cut off with a slitter, and the film was wound in a roll to give respective brown polyimide films of Comparative Examples 22-25. The feeding state during heat treatment and the results such as property and the like of the obtained polyimide films are shown in Table 8. The length of the pin sheet in the longitudinal direction was 95 mm, the length in the width direction was 40 mm, and the pin height from the pin pedestal was 8 mm.

As the results show, in Comparative Examples 22-25, the width of the film end where flatness was poor was wide, which in turn narrowed the effective width. In addition, the difference in the film thickness between right and left is large, suggesting that the uniformity of the film is not good.

Examples 40-43

The green films (thickness 43 μm, width 1200 mm) were each obtained in the same manner as in Example 21 from the polyamic acid solutions obtained in Reference Examples 1-4.

Figure 13:
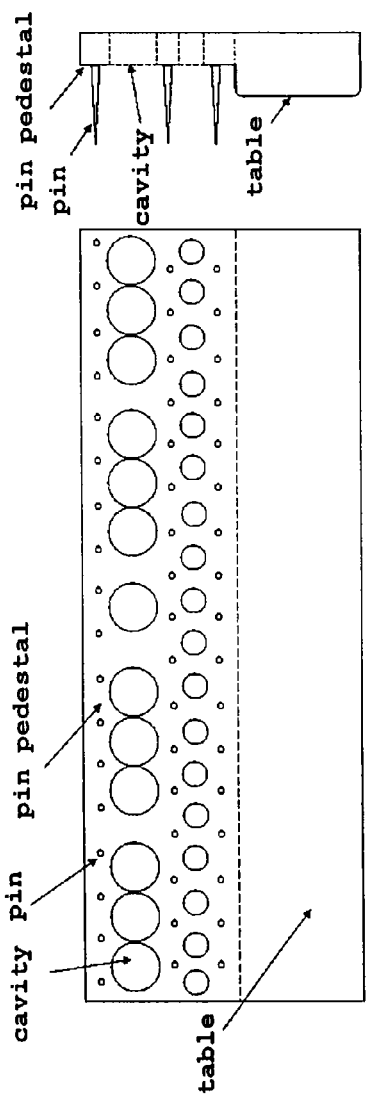
FIG. 13 shows an outline of a pin sheet wherein a table is provided on the outer side in the width direction of the pin to be in contact with the film and the pedestal of the pin has a cavity in the tenter type film processing machine of the present invention.

These obtained green films were passed through a pin tenter wherein pins were planted on the pin sheets with a table set at the outer side of the width direction, as shown in FIG. 13, and heat-treated in the tenter in the same manner as in Examples 36-39 to allow an imidation reaction to proceed. Thereafter, the film was cooled to room temperature in 5 min, the both ends of the film where flatness was poor were cut off with a slitter, and the film was wound in a roll to give respective brown polyimide films of Examples 40-43. The measurement results such as property and the like of the obtained polyimide films are shown in Table 8. The pins were arranged in such a manner that the distance between the pins would be uniform when the pin sheets were lined up, where the pin height from the pin pedestal was 8 mm, the height of the table set at the outer side in the width direction of the pin sheet was 3 mm higher than the pin pedestal and 5 mm lower than the pin tip, and the distance between pin sheets was 1140 mm. In addition, the length in the longitudinal direction of the pin sheet in the longitudinal direction was 95 mm, the length in the width direction was 35 mm, the length of the table set at the outer side in the width direction of the pin sheet was 95 mm, the length in the width direction was 15 mm, and the periphery of the table was chamfered. In addition, cavities corresponding to 29% of the whole pin pedestal were formed between pins on the pin pedestal.

when the pin sheets were lined up, where the pin height from the pin pedestal was 8 mm, the height of the table set at the outer side in the width direction of the pin sheet was 2 mm higher than the pin pedestal and 6 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered. In addition, cavities corresponding to 25% of the whole pin pedestal were formed between pins on the pin pedestal.

The setting of the heat treatment in the tenter was as follows. A two-stage heating (first stage 200° C. for 5 min, temperature was raised at a temperature rise rate of 4° C./sec, second stage 450° C. for 5 min) was applied to allow an imidation reaction to proceed. Thereafter, the film was cooled to room temperature in 5 min, the both ends of the film where flatness was poor were cut off with a slitter, and the film was wound in a roll to give respective brown polyimide films of Examples 44-47. The feeding state during heat treatment and the measurement results such as property and the like of the obtained polyimide films are shown in Table 9.

TABLE 8

| | | | Ex. 36 | Ex. 37 | Ex. 38 | Ex. 39 | Com. Ex. 22 | Com. Ex. 23 | Com. Ex. 24 | Com. Ex. 25 | Ex. 40 | Ex. 41 | Ex. 42 | Ex. 43 |
|---|---|---|---|---|---|---|---|---|---|---|---|---|---|---|
| polyamic acid used | | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin sheet shape | | | table | table | table | table | flat plate | flat plate | flat plate | flat plate | table | table | table | table |
| film feeding state | | | good | good | good | good | good | good | release from pin | good | good | good | good | good |
| state of pin sheet surface | | | good | good | good | good | welding | welding | welding | welding | good | good | good | good |
| release from pin sheet | | | good | good | good | good | baddish | baddish | baddish | bad | good | good | good | good |
| effective width | | mm | 1115 | 1110 | 1120 | 1110 | 1050 | 980.0 | 1000 | 1020 | 1120 | 1110 | 1120 | 1110 |
| thickness | L side | mm | 10.1 | 10.2 | 10.1 | 10.0 | 10.3 | 10 | 10.2 | 10.2 | 21.0 | 21.2 | 21.0 | 21.0 |
| | center | mm | 10.0 | 10.1 | 10.0 | 9.9 | 9.8 | 10 | 9.8 | 10.1 | 21.1 | 21.2 | 21.1 | 20.9 |
| | R side | mm | 10.0 | 10.1 | 10.1 | 10.0 | 9.5 | 9.7 | 9.5 | 9.6 | 21.2 | 21.1 | 21.1 | 21.0 |
| | average | mm | 10.0 | 10.1 | 10.1 | 10.0 | 9.9 | 10.0 | 9.8 | 10.0 | 21.1 | 21.2 | 21.1 | 21.0 |
| tensile strength at break | MD | MPa | 322 | 284 | 299 | 346 | 382 | 303.0 | 220 | 330 | 311 | 262 | 288 | 350 |
| | TD | MPa | 346 | 333 | 287 | 290 | 346 | 290.0 | 231 | 372 | 339 | 330 | 279 | 286 |
| tensile modulus | MD | GPa | 8.7 | 8.1 | 8.9 | 8.0 | 8.0 | 7.2 | 4.0 | 9.2 | 8.5 | 8.0 | 8.9 | 8.3 |
| | TD | GPa | 8.5 | 8.7 | 8.8 | 7.6 | 7.9 | 7.3 | 3.7 | 7.6 | 8.4 | 8.9 | 8.1 | 7.7 |
| tensile elongation at break | MD | % | 32.5 | 41.1 | 47.0 | 48.7 | 28.0 | 34.1 | 65.9 | 46.5 | 33.8 | 40.1 | 43.0 | 52.3 |
| | TD | % | 37.0 | 43.1 | 40.3 | 53.6 | 32.0 | 33.0 | 60.0 | 40.2 | 37.8 | 41.3 | 38.0 | 54.0 |
| CTE | MD | ppm/° C. | 5.1 | 3.4 | 3.0 | 16.1 | 4.6 | 3.8 | 26.2 | 20.0 | 5.2 | 3.2 | 3.1 | 16.8 |
| | TD | ppm/° C. | 7.2 | 2.0 | 2.1 | 15.2 | 4.0 | 6 | 27.5 | 16.2 | 7.3 | 2.2 | 2.7 | 15.8 |
| melting point | | ° C. | none | none | none | none | none | none | none | none | none | none | none | none |
| glass transition temperature | | ° C. | none | none | none | none | none | none | none | none | none | none | none | none |
| thermal decomposition temperature | | ° C. | 610 | 605 | 595 | 610 | 610 | 610 | 595 | 610 | 610 | 605 | 595 | 610 |

Examples 44-47

The green films (thickness 21 μm, width 1200 mm) were each obtained in the same manner as in Example 1 from the polyamic acid solutions obtained in Reference Examples 1-4.

These obtained green films were passed through a pin tenter wherein pins were planted on the pin sheets with a table set at the outer side of the width direction, as shown in FIG. 14 to perform a heat treatment. The pins were arranged in such a manner that the distance between the pins would be uniform The flatness and the effective width of the film were defined as follows.

First, the obtained film was spread on a surface plate with a clean surface, and an uneven film end producing a space between the film and the surface plate was taken as a flatness failure. The both ends of the film were cut until the film end did not rise from the surface of the surface plate and the whole film came into close contact with the surface plate. The film width at that time was defined as an effective width.

For pin tearing, moreover, the width of film tearing at pin portion was measured with a scale at about 10 m from the top of the film.

Comparative Examples 26-29

The green films (thickness 21 μm) were each obtained in the same manner as in Example 1 from the polyamic acid solutions obtained in Reference Examples 1-4.

These green films obtained were held at the both ends in a pin tenter wherein needle pins were planted on the pin sheets free of a table and cavity, as shown in FIG. 15, heat-treated under the conditions as in Example 44, the both ends of the film where flatness was poor were cut off with a slitter, and the film was wound in a roll to give respective brown polyimide films of Comparative Examples 26-29. The feeding state during heat treatment and the results such as property and the like of the obtained polyimide films are shown in Table 9. The length of the pin sheet in the longitudinal direction was 95 mm, the length in the width direction was 40 mm, and the pin height from the pin pedestal was 8 mm.

As the results show, in Comparative Examples 26-29, the width of the film end where flatness was poor was wide, which in turn narrowed the effective width. In addition, the difference in the film thickness between right and left is large, suggesting that the uniformity of the film is not good.

Examples 48-51

The green films (thickness 43 μm, width 1200 mm) were each obtained in the same manner as in Example 21 from the polyamic acid solutions obtained in Reference Examples 1-4.

These obtained green films were passed through a pin tenter wherein pins were planted on the pin sheets with a table set at the outer side of the width direction, as shown in FIG. 16, and heat-treated in the tenter in the same manner as in Examples 44-47 to allow an imidation reaction to proceed. Thereafter, the film was cooled to room temperature in 5 min, the both ends of the film where flatness was poor were cut off with a slitter, and the film was wound in a roll to give respective brown polyimide films of Examples 48-51. The measurement results such as property and the like of the obtained polyimide films are shown in Table 9. The pins were arranged in such a manner that the distance between the pins would be uniform when the pin sheets were lined up, where the pin height from the pin pedestal was 8 mm, the height of the table set at the outer side in the width direction of the pin sheet was 3 mm higher than the pin pedestal and 5 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered. In addition, cavities corresponding to 29% of the whole pin pedestal were formed between pins on the pin pedestal. In addition, cavities corresponding to 38% of the whole sectional area were formed in the table set at the outer side in the width direction of the pin sheet.

TABLE 9

| | | | Ex. 44 | Ex. 45 | Ex. 46 | Ex. 47 | Com. Ex. 26 | Com. Ex. 27 | Com. Ex. 28 | Com. Ex. 29 | Ex. 48 | Ex. 49 | Ex. 50 | Ex. 51 |
|---|---|---|---|---|---|---|---|---|---|---|---|---|---|---|
| polyamic acid used | | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin sheet shape | | | table, cavity | table, cavity | table, cavity | table, cavity | flat plate | flat plate | flat plate | flat plate | table, cavity | table, cavity | table, cavity | table, cavity |
| film feeding state | | | good | good | good | good | good | good | release from pin | good | good | good | good | good |
| state of pin sheet surface | | | good | good | good | good | welding | welding | welding | welding | good | good | good | good |
| release from pin sheet | | | good | good | good | good | baddish | baddish | baddish | bad | good | good | good | good |
| effective width | | mm | 1115 | 1110 | 1120 | 1110 | 1050 | 980 | 1000 | 1020 | 1120 | 1110 | 1120 | 1110 |
| pin tearing | | mm | 1 | 1 | 1 | 1 | 2 | 2 | 2 | 2 | 0 | 0 | 0 | 0 |
| thickness | L side | μm | 10.1 | 10.1 | 10.1 | 10.0 | 10.2 | 10.3 | 10.2 | 10.2 | 21.2 | 21.1 | 21 | 20.9 |
| | center | μm | 10.1 | 10.0 | 10.0 | 10.1 | 9.8 | 9.9 | 9.5 | 10.0 | 21.0 | 21.2 | 21.1 | 21.1 |
| | R side | μm | 10.0 | 10.1 | 10.0 | 10.1 | 9.5 | 9.7 | 9.8 | 9.7 | 21.1 | 21.2 | 21.1 | 21.0 |
| | average | μm | 10.1 | 10.1 | 10.0 | 10.1 | 9.8 | 10.0 | 9.8 | 10.0 | 21.1 | 21.2 | 21.1 | 21.0 |
| tensile strength at break | MD | MPa | 330 | 280 | 302 | 338 | 378 | 311 | 225 | 327 | 322 | 271 | 304 | 354 |
| | TD | MPa | 340 | 328 | 285 | 299 | 341 | 295 | 235 | 365 | 344 | 339 | 288 | 289 |
| tensile modulus | MD | GPa | 8.8 | 8.0 | 8.9 | 8.1 | 7.8 | 7.4 | 4.1 | 8.7 | 8.6 | 8.1 | 9.1 | 8.4 |
| | TD | GPa | 8.5 | 8.7 | 8.7 | 7.9 | 7.5 | 7.4 | 3.7 | 7.4 | 8.5 | 8.9 | 8.3 | 7.9 |
| tensile elongation at break | MD | % | 32.1 | 42.1 | 46.7 | 48.0 | 29.0 | 33.7 | 64.4 | 48.5 | 33.1 | 39.5 | 42.5 | 50.7 |
| | TD | % | 36.8 | 44.4 | 40.0 | 51.8 | 33.6 | 32.3 | 58.9 | 43.1 | 35.3 | 40.5 | 37.1 | 52.8 |
| CTE | MD | ppm/°C. | 5.2 | 3.4 | 3.2 | 15.8 | 4.4 | 3.5 | 25.7 | 19.7 | 5.0 | 3.1 | 3.0 | 16.4 |
| | TD | ppm/°C. | 7.0 | 2.2 | 2.3 | 15.0 | 4.3 | 5.7 | 27.2 | 16.0 | 7.1 | 2.2 | 2.7 | 15.9 |
| melting point | | °C. | none | none | none | none | none | none | none | none | none | none | none | none |
| glass transition temperature | | °C. | none | none | none | none | none | none | none | none | none | none | none | none |
| thermal decomposition temperature | | °C. | 610 | 605 | 595 | 610 | 610 | 610 | 595 | 610 | 610 | 605 | 595 | 610 |

Examples 52-55

The green films (thickness 17 μm, width 1200 mm) were each obtained in the same manner as in Example 1 except the film thickness, from the polyamic acid solutions obtained in Reference Examples 1-4.

Figure 17:
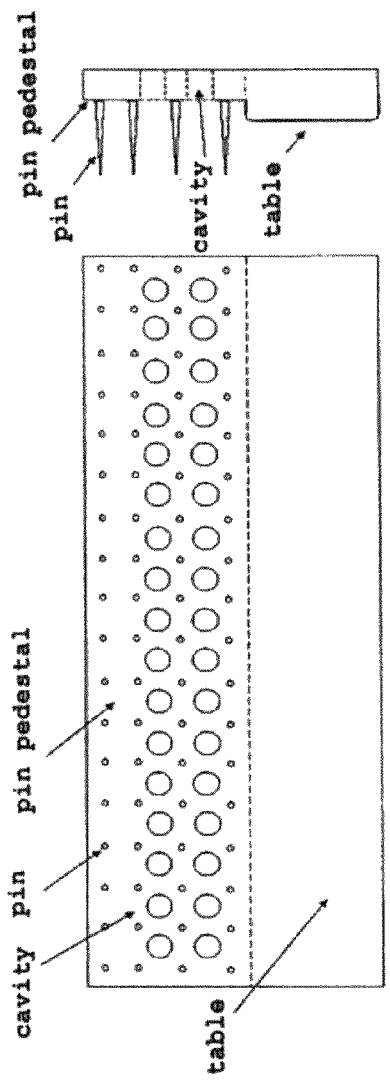
FIG. 17 shows an outline of a pin sheet wherein a table is provided on the outer side in the width direction of the pin to be in contact with the film and the pedestal of the pin has a cavity in the tenter type film processing machine of the present invention.

These obtained green films were passed through a pin tenter wherein pins were planted on the pin sheets with a table set at the outer side of the width direction, as shown in FIG. 17 to perform a heat treatment. The pins were arranged in such a manner that the distance between the pins would be uniform when the pin sheets were lined up, where the pin height from the pin pedestal was 8 mm, the height of the table set at the outer side in the width direction of the pin sheet was 2 mm higher than the pin pedestal and 6 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered. In addition, the distance between the table set at the outer side in the width direction of the pin sheet and the pins provided on the pin sheets and arranged at the outermost part in the width direction was 2.5 mm. In addition, cavities corresponding to 14% of the whole pin pedestal were formed between pins on the pin pedestal. In addition, the shortest distance $L_t$ between the adjacent pins was 4.5 mm relative to the width direction of the pin sheets, the pin arrangements were 4 rows relative to the feeding direction of the pin sheets, the distance $L_M$ of the adjacent pins was 5.2 mm, and the diameter d of the pins piercing the film was 1.0 mm. In addition, the density of the pins relative to the total area of the pedestal provided with the pins was 0.038 pin/mm$^2$.

The setting of the heat treatment in the tenter was as follows. A two-stage heating (first stage 200° C. for 5 min, temperature was raised at a temperature rise rate of 4° C./sec, second stage 450° C. for 5 min) was applied to allow an imidation reaction to proceed. Thereafter, the film was cooled to room temperature in 5 min, the both ends of the film where flatness was poor were cut off with a slitter, and the film was wound in a roll to give respective brown polyimide films of Examples 52-55. The feeding state during heat treatment and the measurement results such as property and the like of the obtained polyimide films are shown in Table 10.

The flatness and the effective width of the film were defined as follows.

First, the obtained film was spread on a surface plate with a clean surface, and an uneven film end producing a space between the film and the surface plate was taken as a flatness failure. The both ends of the film were cut until the film end did not rise from the surface of the surface plate and the whole film came into close contact with the surface plate. The film width at that time was defined as an effective width.

For pin tearing, moreover, the width of film tearing at pin portion was measured with a scale at about 10 m from the top of the film.

Comparative Examples 30-33

The green films (thickness 17 μm) were each obtained in the same manner as in Example 1 except the film thickness, from the polyamic acid solutions obtained in Reference Examples 1-4.

Figure 18:
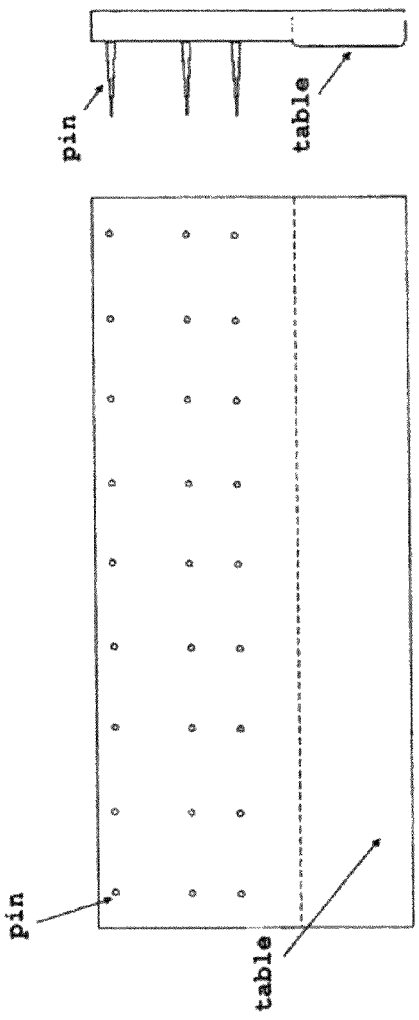
FIG. 18 shows an outline of a pin sheet to be in contact with the film in a conventional tenter type film processing machine.

These obtained green films were passed through a pin tenter wherein pins were planted on the pin sheets with a table set at the outer side of the width direction, as shown in FIG. 18, and heat-treated in the tenter in the same manner as in Examples 52-55 to allow an imidation reaction to proceed. Thereafter, the film was cooled to room temperature in 5 min, the both ends of the film where flatness was poor were cut off with a slitter, and the film was wound in a roll to give respective brown polyimide films of Comparative Examples 30-33. The measurement results such as property and the like of the obtained polyimide films are shown in Table 10. The pins were arranged in such a manner that the distance between the pins would be uniform when the pin sheets were lined up, where the pin height from the pin pedestal was 8 mm, the height of the table set at the outer side in the width direction of the pin sheet was 0.5 mm higher than the pin pedestal and 7.5 mm lower than the pin tip, and the distance between pin sheets was 1140 mm. In addition, the length of the pin sheet in the longitudinal direction was 95 mm, the length in the width direction was 40 mm, the length in the longitudinal direction of the table set at the outer side in the width direction of the pin sheet was 95 mm, the length in the width direction was 15 mm, and the periphery of the table was chamfered.

In addition, the distance between the table set at the outer side in the width direction of the pin sheet and the pins provided on the pin sheets and arranged at the outermost part in the width direction was 11.0 mm. In addition, the shortest distance $L_t$ between the adjacent pins was 6.4 mm relative to the width direction of the pin sheets, the pin arrangements were 3 rows relative to the feeding direction of the pin sheets, the distance $L_M$ of the adjacent pins was 11.0 mm, and the diameter d of the pins piercing the film was 1.0 mm. In addition, the density of the pins relative to the total area of the pedestal provided with the pins was 0.014 pin/mm$^2$.

As the results show in Table 10, in Comparative Examples 30-33, the width of the film end where flatness was poor was wide, which in turn narrowed the effective width. In addition, the difference in the film thickness between right and left is large, suggesting that the uniformity of the film is not good.

Examples 56-59

The green films (thickness 6 μm, width 1200 mm) were each obtained in the same manner as in Example 21 except the film thickness, from the polyamic acid solutions obtained in Reference Examples 1-4.

Figure 19:
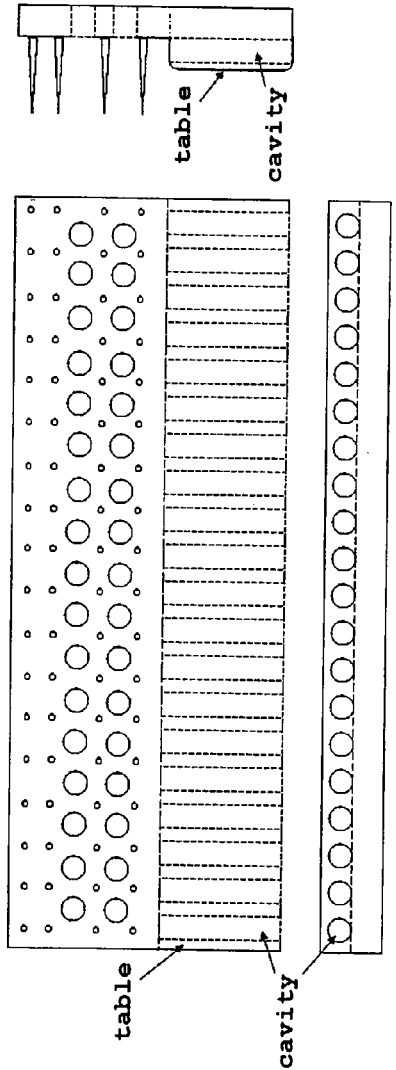
FIG. 19 shows an outline of a pin sheet wherein a table is provided on the outer side in the width direction of the pin to be in contact with the film and the pedestal of the pin and the table have a cavity in the tenter type film processing machine of the present invention.

These obtained green films were passed through a pin tenter wherein pins were planted on the pin sheets with a table set at the outer side of the width direction, as shown in FIG. 19, and heat-treated in the tenter in the same manner as in Examples 52-55 to allow an imidation reaction to proceed. Thereafter, the film was cooled to room temperature in 5 min, the both ends of the film where flatness was poor were cut off with a slitter, and the film was wound in a roll to give respective brown polyimide films of Examples 56-59. The measurement results such as property and the like of the obtained polyimide films are shown in Table 10. The pins were arranged in such a manner that the distance between the pins would be uniform when the pin sheets were lined up, where the pin height from the pin pedestal was 8 mm, the height of the table set at the outer side in the width direction of the pin sheet was 3 mm higher than the pin pedestal and 5 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered.

In addition, the distance between the table set at the outer side in the width direction of the pin sheet and the pins provided on the pin sheets and arranged at the outermost part in the width direction was 3.5 mm. In addition, cavities corresponding to 14% of the whole pin pedestal were formed between pins on the pin pedestal, and cavities corresponding to 38% of the whole sectional area were formed in the table set at the outer side in the width direction of the pin sheet. In addition, the shortest distance $L_t$ between the adjacent pins was 3.5 mm relative to the width direction of the pin sheets, the pin arrangements were 4 rows relative to the feeding direction of the pin sheets, the distance $L_M$ of the adjacent pins was 5.2 mm, and the diameter d of the pins piercing the film was 1.0 mm. In addition, the density of the pins relative to the total area of the pedestal provided with the pins was 0.038 pin/mm².

450° C. for 5 min) was applied to allow an imidation reaction to proceed. The length of the pin sheet was 65.0 mm, and the pin distance was 7.0 mm. Thereafter, the film was cooled to room temperature in 5 min, the pinning state and state of pin tearing were confirmed, the both ends of the film where flatness was poor were cut off with a slitter, and the film was wound in a roll to give respective brown polyimide films of Examples 60-75 and Comparative Examples 34-43. The measurement results such as property and the like of the obtained polyimide films are shown in Tables 12-14. As the pin piercing brush, brush roll set A described below was used.

<Preparation of Pin Piercing Brush Roll>

A strip brush (channel width 5 mm, channel height 5 mm, bristle length 25 mm, total height 30 mm) using Conex (manufactured by TEIJIN LIMITED, aromatic polyamide rod, diameter 0.2 mmφ) as a bristle material was prepared.

TABLE 10

| | | | Example/Comparative Example | | | | | | | | | | | |
|---|---|---|---|---|---|---|---|---|---|---|---|---|---|---|
| | | | Ex. 52 | Ex. 53 | Ex. 54 | Ex. 55 | Com. Ex. 30 | Com. Ex. 31 | Com. Ex. 32 | Com. Ex. 33 | Ex. 56 | Ex. 57 | Ex. 58 | Ex. 59 |
| polyamic acid used | | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin sheet shape | | | table, cavity | table, cavity | table, cavity | table, cavity | flat plate | flat plate | flat plate | flat plate | table, cavity | table, cavity | table, cavity | table, cavity |
| film feeding state | | | good | good | good | good | good | good | release from pin | good | good | good | good | good |
| state of pin sheet surface | | | good | good | good | good | welding | welding | welding | welding | good | good | good | good |
| release from pin sheet | | | good | good | good | good | bad | bad | bad | bad | good | good | good | good |
| effective width | | mm | 1115 | 1110 | 1120 | 1110 | 1050 | 980 | 1000 | 1020 | 1120 | 1110 | 1120 | 1110 |
| pin tearing | | mm | 1 | 1 | 1 | 1 | 3 | 2 | 3 | 3 | 0 | 1 | 0 | 1 |
| thickness | L side | μm | 8.0 | 8.1 | 7.9 | 8.0 | 7.8 | 8.2 | 8.1 | 8.0 | 3.2 | 3.1 | 3.0 | 2.9 |
| | center | μm | 8.0 | 8.0 | 8.0 | 7.9 | 8.2 | 8.0 | 7.7 | 7.8 | 3.1 | 3.1 | 3.0 | 2.9 |
| | R side | μm | 8.1 | 8.1 | 8.0 | 7.9 | 7.6 | 8.2 | 7.8 | 7.7 | 3.1 | 3.0 | 2.9 | 3.0 |
| | average | μm | 8.0 | 8.1 | 8.0 | 7.9 | 7.9 | 8.1 | 7.9 | 7.8 | 3.1 | 3.1 | 3.0 | 2.9 |
| tensile strength at break | MD | MPa | 318 | 309 | 311 | 321 | 329 | 298 | 233 | 318 | 299 | 277 | 289 | 339 |
| | TD | MPa | 333 | 329 | 305 | 307 | 332 | 296 | 246 | 336 | 313 | 319 | 293 | 295 |
| tensile modulus | MD | GPa | 8.5 | 8.2 | 8.7 | 8.3 | 7.8 | 7.8 | 4.4 | 8.2 | 8.4 | 7.9 | 8.8 | 8.2 |
| | TD | GPa | 8.3 | 8.5 | 8.5 | 8.1 | 7.9 | 7.6 | 3.6 | 7.0 | 8.1 | 8.5 | 8.1 | 7.6 |
| tensile elongation at break | MD | % | 30.0 | 38.3 | 44.6 | 44.8 | 31.0 | 34.1 | 60.6 | 45.1 | 30.4 | 36.2 | 39.5 | 47.8 |
| | TD | % | 33.1 | 42.5 | 42.1 | 49.7 | 34.1 | 35.3 | 56.8 | 40.3 | 33.3 | 39.0 | 36.8 | 50.9 |
| CTE | MD | ppm/°C. | 4.1 | 3.1 | 3.4 | 13.6 | 4.6 | 3.3 | 23.0 | 19.0 | 2.8 | 2.9 | 3.2 | 14.0 |
| | TD | ppm/°C. | 5.8 | 2.0 | 2.2 | 12.8 | 4.8 | 5.5 | 25.9 | 14.0 | 5.4 | 2.4 | 2.9 | 13.9 |
| melting point | | °C. | none | none | none | none | none | none | none | none | none | none | none | none |
| glass transition temperature | | °C. | none | none | none | none | none | none | none | none | none | none | none | none |
| thermal decomposition temperature | | °C. | 610 | 605 | 595 | 610 | 610 | 610 | 595 | 610 | 610 | 605 | 595 | 610 |

Examples 60-75, Comparative Examples 34-43

The green films (thickness 21 μm, width 1200 mm, length 1000 m) were each obtained in the same manner as in Example 1 from the polyamic acid solution obtained in Reference Example 1.

Figure 20:
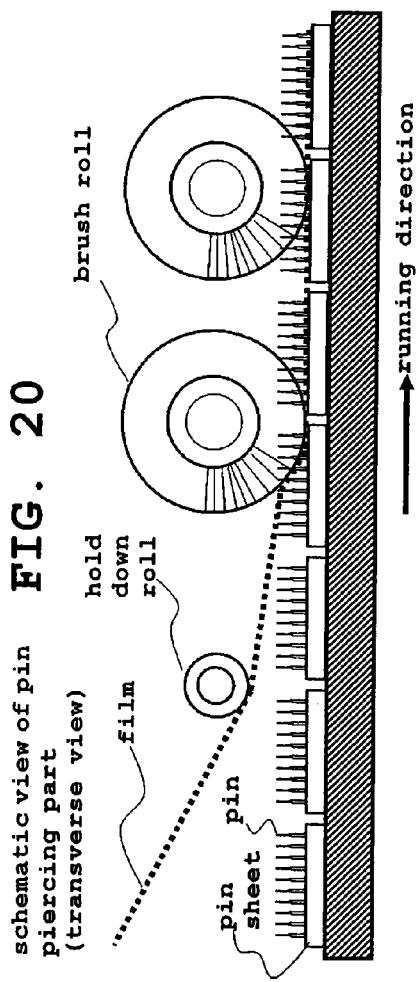
FIG. 20 shows an outline of an apparatus provided with a member for piercing the film end through a holddown pin in the tenter type film processing machine of the present invention.
Figure 21:
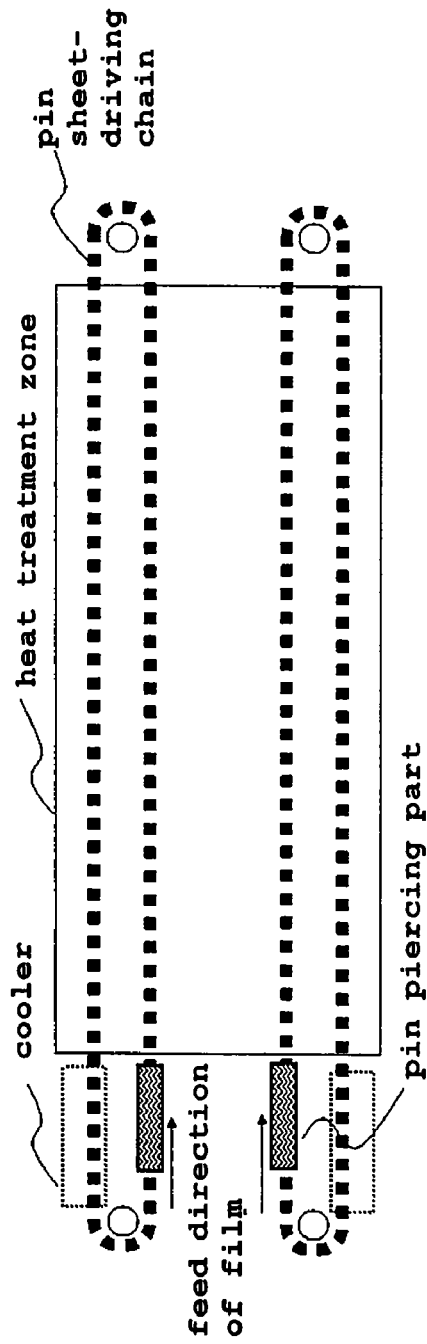
FIG. 21 shows an outline of the whole tenter type film processing machine of the present invention.
Figure 22:
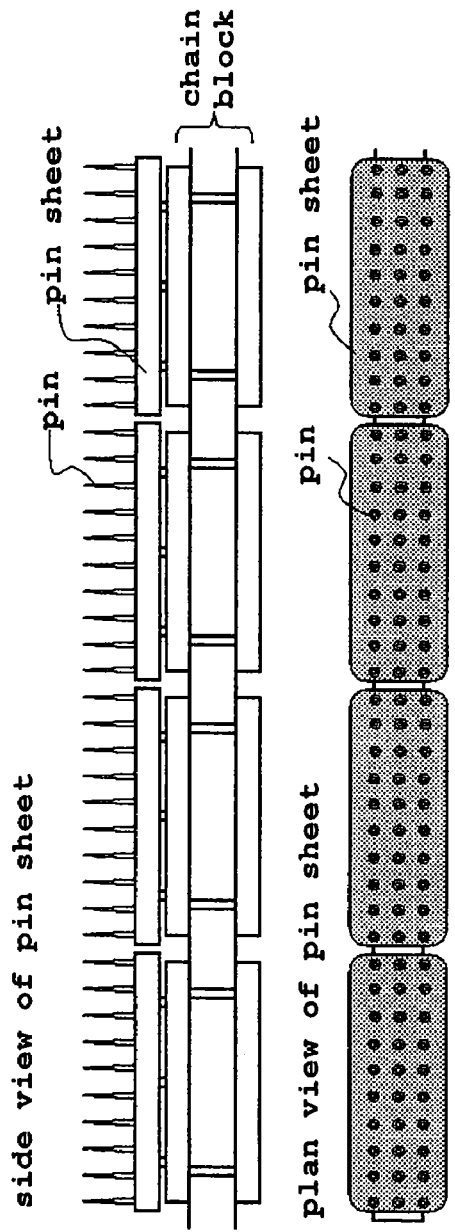
FIG. 22 shows an outline of a preferable pin and a preferable pin sheet in the tenter type film processing machine of the present invention.
Figure 23:
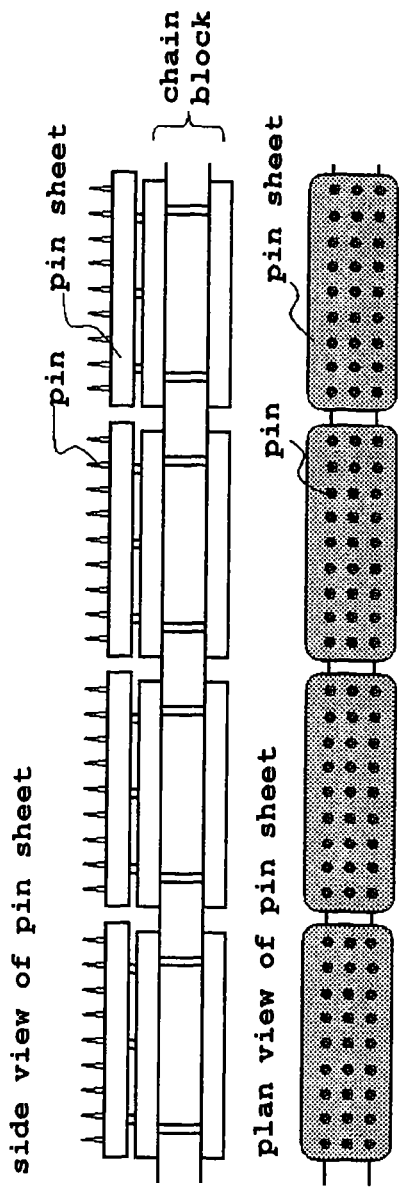
FIG. 23 shows an outline of one embodiment of the pin and pin sheet in the tenter type film processing machine of the present invention.

These obtained green films were passed through a pin tenter having the pin piercing part schematically shown in FIG. 20 and the pin sheet shown in FIG. 22, the distance between the pin sheets was 1140 mm, or 30 mm each of the both ends of the green film was pierced with the pins, and a two-stage heating (first stage 200° C. for 5 min, temperature was raised at a temperature rise rate of 4° C./sec, second stage The strip brush was processed into an outer radius brush (outer shape 160 mm, inner diameter 100 mm, width 40 mm). Four of the same outer radius brushes were produced and used as a pin piercing brush roll set A. The pin piercing brush roll sets shown in Table 11 were prepared in the same manner.

As the strip brush using bristle material of Conex, nylon 6, nylon 66 and polyester, those made of the unit brush standard bristle material manufactured by NIPPON UNIT CORPORATION were used.

The pinning state was confirmed by observation of the initial stage (up to about 100 m from the top), middle stage (50 m before and after 500 m, and end stage (final 100 m) of the film.

For initial pin tearing, the width of film tearing at pin portion was measured with a scale at about 10 m from the top of the film.

Thereafter, experiments were performed with different combination of the polyamic acid solution and the brush roll set. The results are shown in Tables 12-14.

The brush sets A, B, C afforded good pinning state. The brush rolls D, E, F, G showed difficult piercing of the film with the pins and pin tearing frequently occurred. With the lapse of time, bristle material was deformed, worsening the pinning state, and the film was released from the pins.

While brush rolls H, I showed good pinning, the bristle material partly stabbed the film, sometimes degrading the strength of the pin portion.

TABLE 11

| brush | bristle material | tensile modulus GPa | glass transition temperature °C. | melt temperature °C. | bristle diameter mm |
|---|---|---|---|---|---|
| A | Conex | 8.8 | 270 | 430 | 0.2 |
| B | | | | | 0.35 |
| C | | | | | 0.5 |
| D | nylon 66 | 3 | 50 | 265 | 0.15 |
| E | nylon 6 | 2.5 | 48 | 225 | 0.15 |
| F | polyester | 5.1 | 78 | 255 | 0.3 |
| G | | | | | 0.9 |
| H | carbon | 230 | none | >600 | 0.15 |
| I | glass | 80 | none | >600 | 0.08 |

TABLE 12

| | | Example/Comparative Example | | | | | | | | |
|---|---|---|---|---|---|---|---|---|---|---|
| | | Ex. 60 | Ex. 61 | Ex. 62 | Ex. 63 | Ex. 64 | Ex. 65 | Ex. 66 | Ex. 67 | Ex. 68 |
| polyamic acid | | Ref. Ex. 1 | Ref. Ex. 1 | Ref. Ex. 1 | Ref. Ex. 1 | Ref. Ex. 1 | Ref. Ex. 2 | Ref. Ex. 2 | Ref. Ex. 2 | Ref. Ex. 3 |
| brush roll set | | A | B | C | H | I | C | H | I | C |
| effective width mm | | 1110 | 1110 | 1120 | 1060 | 1080 | 1110 | 1080 | 1070 | 1110 |
| flatness | | good | good | good | good | good | good | good | good | good |
| initial pin tearing | | about 1 mm | none | none | about 2 mm | about 2 mm | about 1 mm | none | none | none |
| pinning state | initial stage | good | good | good | good | good | good | good | good | good |
| | middle stage | good | good | good | good | good | good | good | good | good |
| | end stage | good | good | good | good | good | good | good | good | good |

TABLE 13

| | | Example/Comparative Example | | | | | | | | |
|---|---|---|---|---|---|---|---|---|---|---|
| | | Ex. 69 | Ex. 70 | Ex. 71 | Ex. 72 | Ex. 73 | Ex. 74 | Ex. 75 | Com. Ex. 34 | Com. Ex. 35 |
| polyamic acid | | Ref. Ex. 3 | Ref. Ex. 3 | Ref. Ex. 4 | Ref. Ex. 4 | Ref. Ex. 4 | Ref. Ex. 4 | Ref. Ex. 4 | Ref. Ex. 1 | Ref. Ex. 1 |
| brush roll set | | H | I | A | B | C | H | I | D | E |
| effective width mm | | 1070 | 1080 | 1110 | 1110 | 1120 | 1050 | 1070 | 1110 | 1120 |
| flatness | | good | good | good | good | good | good | good | bad | bad |
| initial pin tearing | | about 1 mm | about 1 mm | about 1 mm | none | none | none | none | about 2 mm | about 2 mm |
| pinning state | initial stage | good | good | good | good | good | good | good | good | release from pin |
| | middle stage | good | good | good | good | good | good | good | release from pin | release from pin |
| | end stage | good | good | good | good | good | good | good | release from pin | release from pin |

TABLE 14

| | Example/Comparative Example | | | | | | | |
|---|---|---|---|---|---|---|---|---|
| | Com. Ex. 36 | Com. Ex. 37 | Com. Ex. 38 | Com. Ex. 39 | Com. Ex. 40 | Com. Ex. 41 | Com. Ex. 42 | Com. Ex. 43 |
| polyamic acid | Ref. Ex. 1 | Ref. Ex. 1 | Ref. Ex. 2 | Ref. Ex. 3 | Ref. Ex. 4 | Ref. Ex. 4 | Ref. Ex. 4 | Ref. Ex. 4 |
| brush roll set | F | G | G | G | D | E | F | G |

TABLE 14-continued

| | | Example/Comparative Example | | | | | | | |
|---|---|---|---|---|---|---|---|---|---|
| | | Com. Ex. 36 | Com. Ex. 37 | Com. Ex. 38 | Com. Ex. 39 | Com. Ex. 40 | Com. Ex. 41 | Com. Ex. 42 | Com. Ex. 43 |
| effective width | mm | 1110 | 1110 | 1020 | 900 | 900 | 850 | 850 | 900 |
| flatness | | bad about 2 mm | bad about 2 mm | bad about 2 mm | bad >5 mm | bad >5 mm | bad >5 mm | bad >5 mm | bad >5 mm |
| initial pin tearing | | | | | | | | | |
| pinning state | initial middle stag | good release from pin | good good | good good | release from pin | release from pin | release from pin | release from pin | release from pin |
| | end stage | release from pin | release from pin | release from pin | | | | | |

Examples 76-79

The green films (thickness 21 μm, width 1200 mm) were each obtained in the same manner as in Example 1 from the polyamic acid solutions obtained in Reference Examples 1-4.

Figure 24:
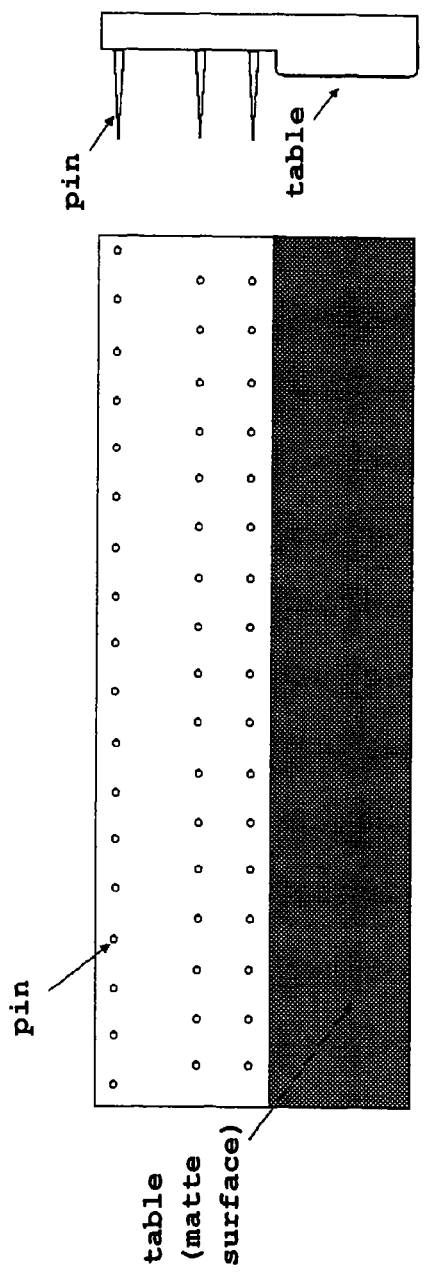
FIG. 24 shows an outline of a pin sheet wherein a table is provided on the outer side in the width direction of the pin to be in contact with the film and a part higher than the pin pedestal is matte-processed in the tenter type film processing machine of the present invention.

These obtained green films were passed through a pin tenter wherein pins were planted on the pin sheets with a table set at the outer side of the width direction, as shown in FIG. 24 to perform a heat treatment. The film ends to be held by the pin sheets were set in such a manner that the position of the end in the width direction of the film after a treatment in the tenter would be 10 mm outside the outermost side in the width direction of the pins provided on the pin sheets. In addition, the pins were arranged in such a manner that the distance between the pins would be uniform when the pin sheets were lined up, where the pin height from the pin pedestal was 8 mm, the height of the table (a part higher than the pin pedestal) set at the outer side in the width direction of the pin sheet was 2 mm higher than the pin pedestal and 6 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered. In addition, the surface of the table (a part higher than the pin pedestal) set at the outer side in the width direction of the pin sheet was matte-processed by a sandblast treatment, where the surface roughness Ra was 15 μm.

The setting of the heat treatment in the tenter was as follows. A two-stage heating (first stage 200° C. for 5 min, temperature was raised at a temperature rise rate of 4° C./sec, second stage 450° C. for 5 min) to allow an imidation reaction to proceed. Thereafter, the film was cooled to room temperature in 5 min, the both ends of the film where flatness was poor were cut off with a slitter, and the film was wound in a roll to give respective brown polyimide films of Examples 76-79. The feeding state during heat treatment and the measurement results such as property and the like of the obtained polyimide films are shown in Table 15.

The flatness and the effective width of the film were defined as follows.

First, the obtained film was spread on a surface plate with a clean surface, and an uneven film end producing a space between the film and the surface plate was taken as a flatness failure. The both ends of the film were cut until the film end did not rise from the surface of the surface plate and the whole film came into close contact with the surface plate. The film width at that time was defined as an effective width.

In addition, for pin tearing, the width of film tearing at pin portion was measured with a scale at about 10 m from the top of the film.

Comparative Examples 44-47

The green films (thickness 21 μm) were each obtained in the same manner as in Example 1 from the polyamic acid solutions obtained in Reference Examples 1-4.

Figure 25:
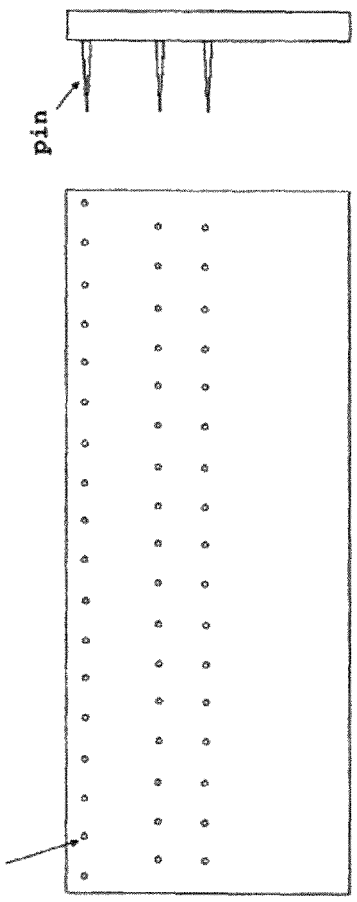
FIG. 25 shows an outline of a pin sheet to be in contact with a film in a conventional tenter type film processing machine.

These green films obtained were held at the both ends in a pin tenter wherein needle pins were planted on the pin sheets free of a table and cavity, as shown in FIG. 25, wherein the film ends to be held by the pin sheets were set in such a manner that the position of the end in the width direction of the film after a treatment in the tenter would be 2 mm outside the outermost side in the width direction of the pins provided on the pin sheets. Then, the film was heat-treated under similar conditions as in Example 76, the both ends of the film where flatness was poor were cut off with a slitter, and the film was wound in a roll to give respective brown polyimide films of Comparative Examples 44-47. The feeding state during heat treatment and the results such as property and the like of the obtained polyimide films are shown in Table 15. The length of the pin sheet in the longitudinal direction was 95 mm, the length in the width direction was 40 mm, and the pin height from the pin pedestal was 8 mm.

As the results show, in Comparative Examples 44-47, the width of the film end where flatness was poor was wide, which in turn narrowed the effective width. In addition, the difference in the film thickness between right and left is large, suggesting that the uniformity of the film is not good.

Examples 80-83

The green films (thickness 43 μm, width 1200 mm) were each obtained in the same manner as in Example 21 from the polyamic acid solutions obtained in Reference Examples 1-4.

Figure 26:
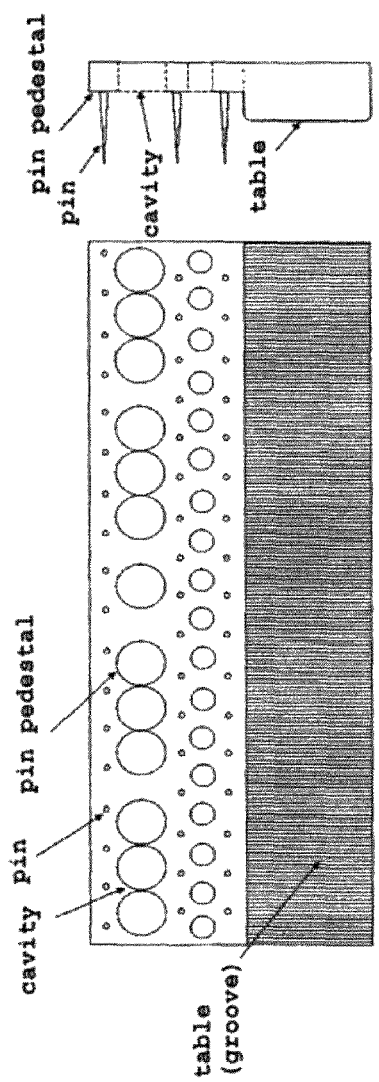
FIG. 26 shows an outline of a pin sheet wherein a table is provided on the outer side in the width direction of the pin to be in contact with the film and a part higher than the pin pedestal is groove-processed in the tenter type film processing machine of the present invention.

These obtained green films were passed through a pin tenter wherein pins were planted on the pin sheets with a table set at the outer side of the width direction, as shown in FIG. 26, and the film ends to be held by the pin sheets were set in such a manner that the position of the end in the width direction of the film after a treatment in the tenter would be 15 mm outside the outermost side in the width direction of the pins provided on the pin sheets. In the same manner as in Examples 76-79, the films were heat-treated in the tenter to allow an imidation reaction to proceed. Thereafter, the film was cooled to room temperature in 5 min, the both ends of the film where flatness was poor were cut off with a slitter, and the film was wound in a roll to give respective brown polyimide films of Examples 80-83. The measurement results such as property and the like of the obtained polyimide films are shown in Table 15.

The pins were arranged in such a manner that the distance between the pins would be uniform when the pin sheets were lined up, where the pin height from the pin pedestal was 8 mm, the height of the table (a part higher than the pin pedestal) set at the outer side in the width direction of the pin sheet was 3 mm higher than the pin pedestal and 5 mm lower than the pin tip, and the distance between pin sheets was 1140 mm. In addition, the length of the pin sheet in the longitudinal direction was 95 mm, the length in the width direction was 35 mm, the length in the longitudinal direction of the table set at the outer side in the width direction of the pin sheet was 95 mm, the length in the width direction was 15 mm, and the periphery of the table was chamfered. In addition, the surface of the table (a part higher than the pin pedestal) set at the outer side in the width direction of the pin sheet was provided with a groove (width 1 mm, depth 1 mm) in the width direction. In addition, cavities corresponding to 29% of the whole pin pedestal were formed between pins on the pin pedestal.

and uniformity in the film thickness. The producibility of the polymer film production is also improved. Therefore, it is industrially extremely significant as an apparatus for producing a polymer film or a production method of a polymer film.

They are a production apparatus and a production method effective as a cast film forming method for polyimide film, polyamideimide film, cellulose film, polyamide film and the like, and are industrially significant.

The invention claimed is:

1. An apparatus for producing a polymer film, comprising:
   a tenter type processing part comprising a plurality of pin sheets and a plurality of pins provided for individual pin sheets, wherein the tenter processing part comprises
   a film end fixing type tenter configured to perform a treatment of a polymer film or a polymer precursor film and including a device holding film ends at both ends in a width-wise direction of the film by piercing the both ends of the film with the pins and feeding the film while being stretched tightly in the width-wise direction or a feeding direction, and
   a hold down brush roll configured to press the film against the pins so that the pins pierce through the film and disposed at a location of the apparatus where the film meets the pins so that the pins pierce through the film,

TABLE 15

| | | | Ex. 76 | Ex. 77 | Ex. 78 | Ex. 79 | Com. Ex. 44 | Com. Ex. 45 | Com. Ex. 46 | Com. Ex. 47 | Ex. 80 | Ex. 81 | Ex. 82 | Ex. 83 |
|---|---|---|---|---|---|---|---|---|---|---|---|---|---|---|
| polyamic acid used | | | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 | Ref. Ex. 1 | Ref. Ex. 2 | Ref. Ex. 3 | Ref. Ex. 4 |
| pin sheet shape | | | table | table | table | table | flat plate | flat plate | flat plate | flat plate | table | table | table | table |
| surface of pin sheet table | | | matte | matte | matte | matte | mirror | mirror | mirror | mirror | groove | groove | groove | groove |
| film feeding state | | | good | good | good | good | good | good | release from pin | good | good | good | good | good |
| state of pin sheet surface | | | good | good | good | good | welding baddish | welding bad | welding baddish | welding bad | good | good | good | good |
| release from pin sheet | | | good | good | good | good | baddish | bad | baddish | bad | good | good | good | good |
| effective width | | mm | 1115 | 1110 | 1120 | 1110 | 1050 | 980 | 1000 | 1020 | 1120 | 1110 | 1120 | 1110 |
| pin tearing | | mm | 1 | 1 | 1 | 1 | 2 | 2 | 2 | 2 | 0 | 0 | 0 | 0 |
| thickness | L side | μm | 10.0 | 10.1 | 10.0 | 10.1 | 10.2 | 10.1 | 9.7 | 10.3 | 21.2 | 21.2 | 21.0 | 21.1 |
| | center | μm | 10.1 | 10.2 | 10.1 | 10.1 | 9.7 | 10.3 | 9.9 | 10.0 | 21.1 | 21.1 | 21.1 | 20.9 |
| | R side | μm | 10.1 | 10.1 | 9.9 | 10.2 | 9.6 | 9.7 | 9.9 | 10.2 | 21.1 | 21.1 | 21.2 | 21.1 |
| | average | μm | 10.1 | 10.1 | 10.0 | 10.1 | 9.8 | 10.0 | 9.8 | 10.2 | 21.1 | 21.1 | 21.1 | 21.0 |
| tensile strength at break | MD | MPa | 318 | 278 | 305 | 337 | 358 | 298 | 231 | 328 | 308 | 276 | 293 | 363 |
| | TD | MPa | 322 | 329 | 298 | 287 | 338 | 295 | 244 | 359 | 322 | 337 | 288 | 299 |
| tensile modulus | MD | GPa | 8.6 | 8.0 | 9.1 | 7.9 | 8.3 | 7.1 | 4.4 | 9.1 | 8.2 | 8.1 | 8.9 | 8.8 |
| | TD | GPa | 8.3 | 8.7 | 8.9 | 7.4 | 7.8 | 7.4 | 3.8 | 7.4 | 8.3 | 8.7 | 8.2 | 7.7 |
| tensile elongation at break | MD | % | 33.6 | 41.9 | 45.8 | 49.4 | 29.0 | 34.6 | 63.1 | 46.9 | 34.2 | 38.9 | 44.2 | 49.6 |
| | TD | % | 37.8 | 43.6 | 38.8 | 53.5 | 34.3 | 32.5 | 58.9 | 41.1 | 39.1 | 40.4 | 39.4 | 52.8 |
| CTE | MD | ppm/°C. | 5.2 | 3.5 | 3.1 | 16.3 | 4.5 | 3.8 | 25.5 | 20.2 | 5.3 | 3.3 | 3.0 | 16.6 |
| | TD | ppm/°C. | 7.2 | 2.2 | 2.3 | 15.4 | 4.1 | 5.9 | 27.3 | 16.1 | 7.5 | 2.1 | 2.9 | 15.3 |
| melting point | | °C. | none | none | none | none | none | none | none | none | none | none | none | none |
| glass transition temperature | | °C. | none | none | none | none | none | none | none | none | none | none | none | none |
| thermal decomposition temperature | | °C. | 610 | 605 | 595 | 610 | 610 | 610 | 595 | 610 | 610 | 605 | 595 | 610 |

According to the present invention, when a polymer film, particularly a polyimide film, is produced using a tenter type feeding apparatus for drying and a heat treatment, deformation of the film in the vicinity of the pin can be suppressed, breakage caused by pores made by piercing the film with pins can be suppressed, the distortion of the whole film can be reduced, and the uneven film thickness can be reduced. The obtained film is superior in the quality in the width direction wherein each of the pin sheets comprises a pin pedestal on which the pins stand and a high part that is higher than the pin pedestal and provided at an outer side of the pin sheet relative to the pin pedestal and in the width direction, and the high part is configured to contact the film so that the film does not contact the pin pedestal when the film is pressed with said hold down brush roll and pierced with the pins.

2. The apparatus of claim 1, wherein the height of the high part is set to be 3-8 mm lower than that of the pin tip.

3. The apparatus of claim 1, wherein the height of the high part is set to be 1-5 mm higher than that of the pin pedestal.

4. The apparatus of claim 1, 2 or 3, wherein the periphery of the high part is chamfered.

5. An apparatus for producing a polymer film, comprising:
a tenter type processing part comprising a plurality of pin sheets and a plurality of pins provided for individual pin sheets, wherein the tenter processing part comprises
a film end fixing type tenter configured to perform a treatment of a polymer film or a polymer precursor film and including a device holding film ends at both ends in a width-wise direction of the film by piercing the both ends of the film with the pins and feeding the film while being stretched tightly in the width-wise direction or a feeding direction, and
a hold down brush roll configured to press the film against the pins so that the pins pierce through the film and disposed at a location of the apparatus where the film meets the pins so that the pins pierce through the film,
wherein each of the pin sheets comprises a pin pedestal on which the pins stand and a high part that is higher than the pin pedestal and provided at an outer side of the pin sheet relative to the pin pedestal in the width direction, the pin pedestal provided with the pins of the pin sheet has a cavity formed in the pin pedestal and the film does not contact the pin pedestal when the film is pressed with said hold down brush roll and pierced with a pin.

6. The apparatus of claim 5, wherein the cavity is fonned between the pins of the pedestal.

7. The apparatus of claim 5, wherein a cavity area of the pin pedestal is 10-50% of an area of the whole pin pedestal.

8. The apparatus of claim 5, wherein a cavity in the width direction is provided in the high part.

9. The apparatus of claim 8, wherein the total sectional area of the cavity formed in the high part is 20-80% of the total sectional area of the high part.

10. An apparatus for producing a polymer film, comprising:
a tenter type processing part comprising a plurality of pin sheets and a plurality of pins provided for individual pin sheets, wherein the tenter processing part comprises
a film end fixing type tenter configured to perform a treatment of a polymer film or a polymer precursor film and including a device holding film ends at both ends in a width-wise direction of the film by piercing the both ends of the film with the pins and feeding the film while being stretched tightly in the width-wise direction or a feeding direction, and
a hold down brush roll configured to press the film against the pins so that the pins pierce through the film and disposed at a location of the apparatus where the film meets the pins so that the pins pierce through the film,
wherein each of the pin sheets comprises a pin pedestal on which the pins stand and a high part that is higher than the pin pedestal and provided at an outer side of the pin sheet relative to the pin pedestal in the width direction, the high part is configured to contact the film so that the film does not contact the pin pedestal when the film is pressed with said hold down brush roll and pierced with the pins, and the distance between the high part and the pin provided in the pin sheet at the outermost part of the width direction is not less than 2 mm and not more than 10 mm, and a pin density (P) satisfies the following relationship (1):

$$0.023 \leq P \leq 0.092 \qquad (1)$$

wherein P is a density (pins/mm$^2$) of the pins relative to the total area of the pedestal provided with the pins other than the high part of the pin sheet.

11. The apparatus of claim 10, wherein, as the transverse arrangement of the pins to be provided on the pin pedestal, the shortest distance Lt (mm) of the adjacent pins relative to the width direction of the pin sheet is 2-8 times the diameter d (mm) of the pins for piercing the film.

12. The apparatus of claim 10 or 11, wherein, as the longitudinal arrangement of the pins to be provided on the pin pedestal, the distance $L_M$ (mm) of the adjacent pins relative to the feeding direction of the pin sheet is 2-8 times the diameter d (mm) of the pins for piercing the film, and the pin sheet comprises at least two rows of pin longitudinal arrangements.

* * * * *

UNITED STATES PATENT AND TRADEMARK OFFICE
CERTIFICATE OF CORRECTION

| | | |
|---|---|---|
| PATENT NO. | : 8,167,600 B2 | Page 1 of 1 |
| APPLICATION NO. | : 11/912970 | |
| DATED | : May 1, 2012 | |
| INVENTOR(S) | : Shinji Fujita et al. | |

It is certified that error appears in the above-identified patent and that said Letters Patent is hereby corrected as shown below:

In the Claims:

At column 47, claim number 6, line number 30, please replace "fonned" with --formed--.

Signed and Sealed this
Eleventh Day of September, 2012

David J. Kappos
*Director of the United States Patent and Trademark Office*